(12) United States Patent
Rico Alvarino et al.

(10) Patent No.: US 12,543,181 B2
(45) Date of Patent: Feb. 3, 2026

(54) INDICATING CARRIER GROUPING FOR SUPPLEMENTAL UPLINK (SUL) COMMUNICATIONS

(71) Applicant: QUALCOMM Incorporated, San Diego, CA (US)

(72) Inventors: Alberto Rico Alvarino, San Diego, CA (US); Peter Gaal, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 18/002,026

(22) PCT Filed: Aug. 12, 2021

(86) PCT No.: PCT/US2021/045779
§ 371 (c)(1),
(2) Date: Dec. 15, 2022

(87) PCT Pub. No.: WO2022/040013
PCT Pub. Date: Feb. 24, 2022

(65) Prior Publication Data
US 2023/0239084 A1    Jul. 27, 2023

(30) Foreign Application Priority Data
Aug. 18, 2020    (GR) .............................. 20200100491

(51) Int. Cl.
*H04W 72/21*    (2023.01)
*H04L 5/00*    (2006.01)
*H04W 72/02*    (2009.01)

(52) U.S. Cl.
CPC ............. *H04W 72/21* (2023.01); *H04L 5/001* (2013.01); *H04L 5/0098* (2013.01); *H04W 72/02* (2013.01)

(58) Field of Classification Search
CPC ...... H04W 72/02; H04W 72/21; H04L 5/001; H04L 5/0098
See application file for complete search history.

(56) References Cited

U.S. PATENT DOCUMENTS

| | | | |
|---|---|---|---|
| 10,880,913 B2 | 12/2020 | Lee et al. | |
| 2017/0251461 A1* | 8/2017 | Parkvall | H04L 5/0053 |

(Continued)

FOREIGN PATENT DOCUMENTS

| | | |
|---|---|---|
| CN | 109802799 A | 5/2019 |
| CN | 111096043 A | 5/2020 |
| WO | 2019099536 A1 | 5/2019 |

OTHER PUBLICATIONS

International Search Report and Written Opinion—PCT/US2021/045779—ISA/EPO—Nov. 29, 2021.

(Continued)

*Primary Examiner* — Kevin C. Harper
(74) *Attorney, Agent, or Firm* — Patterson+ Sheridan, L.L.P.

(57) ABSTRACT

Aspects of the present disclosure provide apparatus, methods, processing systems, and computer-readable mediums for indicating carrier pairings in supplemental uplink (SUL) communications. A method that may be performed by a user equipment (UE) generally includes determining carrier groupings for SUL communications supported by the UE, each carrier grouping comprising at least one component carrier (CC) carried in an SUL band and at least one CC carried in a non-supplemental uplink (NSUL) band and providing signaling indicating the carrier groupings for a (Continued)

combination of at least three CCs jointly carried in at least one SUL band and at least one NSUL band.

30 Claims, 15 Drawing Sheets

(56) References Cited

U.S. PATENT DOCUMENTS

| | | | |
|---|---|---|---|
| 2018/0145815 A1* | 5/2018 | Takeda | H04W 28/04 |
| 2019/0082451 A1 | 3/2019 | Yun et al. | |
| 2019/0141697 A1 | 5/2019 | Islam et al. | |
| 2020/0229175 A1* | 7/2020 | Li | H04W 72/543 |

OTHER PUBLICATIONS

Nokia, et al., "UE Capabilities for Pairing of SOL and SUL", 3GPP Draft, 3GPP TSG-RAN WG4 Meeting #89, R4-1815002, UE Capabilities for SOL and SUL Pairing, 3rd Generation Partnership Project (3GPP), Mobile Competence Centre, 650, Route Des Lucioles, F-06921 Sophia-Antipolis Cedex, France,E vol. RAN WG4, No. Spokane, USA, Nov. 12, 2018-Nov. 16, 2018, Nov. 11, 2018 (Nov. 11, 2018), XP051559333, 3 Pages, Section 3, page second-page third Section 2, page first.

Samsung: "On the Procedures for SUL", 3GPP Draft, 3GPP TSG-RAN WG2 Meeting #100, R2-1712836, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 27, 2017-Dec. 1, 2017, Nov. 17, 2017 (Nov. 17, 2017), XP051371723, 4 Pages, Figures 1.22.

* cited by examiner

INDICATING CARRIER GROUPING FOR SUPPLEMENTAL UPLINK (SUL) COMMUNICATIONS

CROSS-REFERENCE TO RELATED APPLICATIONS

This application is a national stage application under 35 U.S.C. 371 of PCT/US2021/045779, filed Aug. 12, 2021, which claims benefit of and priority to Greece Provisional Application No. 20200100491, filed Aug. 18, 2020, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for indicating carrier grouping for supplemental uplink (SUL) communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (NR) (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation (CA).

With regard to CA, communication links may be through one or more carriers. For example, a base station (BS) may use a CA of multiple component carriers (CCs) for transmission of data. The CCs may include a primary component carrier (PCC) and one or more secondary component carriers (SCCs). A PCC may be referred to as a primary cell (PCell) and an SCC may be referred to as a secondary cell (SCell). For dual connectivity, a special cell on a secondary BS (e.g., secondary eNodeB (SeNB)), or a primary secondary cell group (SCG) cell (PSCell) (e.g., a PCell in a secondary cell group), may support the UL control channels for the SeNB. The operating states of SCells may be controlled to improve user equipment (UE) performance (e.g., to reduce power consumption in UEs).

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several innovative aspects, no single one of which is solely responsible for the desirable attributes. After considering this discussion, and particularly after reading the section entitled "Detailed Description" one will understand how the features of this disclosure provide advantages that include improved carrier grouping.

Certain aspects of the subject matter described in this disclosure can be implemented in a method for wireless communication by a user equipment (UE). The method generally includes determining carrier groupings for supplemental uplink (SUL) communications supported by the UE, each grouping comprising at least one SUL component carrier (CC) and at least one non-supplemental uplink (NSUL) CC; and providing signaling indicating a combination of at least one SUL CC and at least two NSUL CC, wherein the signaling also indicates the carrier groupings.

Certain aspects of the subject matter described in this disclosure can be implemented in a method for wireless communication by a UE. The method generally includes determining carrier groupings for SUL communications supported by the UE, each carrier grouping comprising at least one CC carried in an SUL band and at least one CC carried in a NSUL band; and providing signaling indicating the carrier groupings for a combination of at least three CCs jointly carried in at least one SUL band and at least one NSUL band.

Certain aspects of the subject matter described in this disclosure can be implemented in a method for wireless communication by a network entity. The method generally includes receiving, from a UE, signaling indicating a combination of at least one SUL CC and at least two NSUL CCs, wherein the signaling also indicates carrier groupings, each grouping comprising at least one SUL CC and at least one NSUL CC; and processing uplink (UL) transmissions from the UE in accordance with the indicated carrier groupings.

Certain aspects of the subject matter described in this disclosure can be implemented in a method for wireless communication by a network entity. The method generally includes receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band; and processing UL transmissions from the UE in accordance with the indicated carrier groupings.

Certain aspects of the subject matter described in this disclosure can be implemented in an apparatus for wireless communications by a UE. The apparatus generally includes at least one processor; and a memory coupled to the least at least one processor to cause the apparatus to: determine carrier groupings for SUL communications supported by the UE, each grouping comprising at least one SUL CC and at least one NSUL CC, and providing signaling indicating a combination of at least one SUL CC and at least two NSUL CC, wherein the signaling also indicates the carrier groupings.

Certain aspects of the subject matter described in this disclosure can be implemented in an apparatus for wireless communications by a UE. The apparatus generally includes at least one processor; and a memory coupled to the least at least one processor to cause the apparatus to: determine carrier groupings for SUL communications supported by the UE, each carrier grouping comprising at least one CC carried in an SUL band and at least one CC carried in a NSUL band; and provide signaling indicating the carrier groupings for a combination of at least three CCs jointly carried in at least one SUL band and at least one NSUL band.

Certain aspects of the subject matter described in this disclosure can be implemented in an apparatus for wireless communications by a network entity. The apparatus generally includes at least one processor; and a memory coupled to the least at least one processor to cause the apparatus to: receive, from a UE, signaling indicating a combination of at least one SUL CC and at least two NSUL CCs, wherein the signaling also indicates carrier groupings, each grouping comprising at least one SUL CC and at least one NSUL CC, and processing UL transmissions from the UE in accordance with the indicated carrier groupings.

Certain aspects of the subject matter described in this disclosure can be implemented in an apparatus for wireless communications by a network entity. The apparatus generally includes at least one processor; and a memory coupled to the least at least one processor to cause the apparatus to: receive, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band; and process UL transmissions from the UE in accordance with the indicated carrier groupings.

Certain aspects of the subject matter described in this disclosure can be implemented in an apparatus for wireless communications by a UE. The apparatus generally includes means for determining carrier groupings for SUL communications supported by the UE, each grouping comprising at least one SUL CC and at least one NSUL CC, and means for providing signaling indicating a combination of at least one SUL CC and at least two NSUL CC, wherein the signaling also indicates the carrier groupings.

Certain aspects of the subject matter described in this disclosure can be implemented in an apparatus for wireless communications by a UE. The apparatus generally includes means for determining carrier groupings for SUL communications supported by the UE, each carrier grouping comprising at least one CC carried in an SUL band and at least one CC carried in a NSUL band; and means for providing signaling indicating the carrier groupings for a combination of at least three CCs jointly carried in at least one SUL band and at least one NSUL band.

Certain aspects of the subject matter described in this disclosure can be implemented in an apparatus for wireless communications by a network entity. The apparatus generally includes means for receiving, from a UE, signaling indicating a combination of at least one SUL CC and at least two NSUL CCs, wherein the signaling also indicates carrier groupings, each grouping comprising at least one SUL CC and at least one NSUL CC, and means for processing UL transmissions from the UE in accordance with the indicated carrier groupings.

Certain aspects of the subject matter described in this disclosure can be implemented in an apparatus for wireless communications by a network entity. The apparatus generally includes means for receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band; and means for processing UL transmissions from the UE in accordance with the indicated carrier groupings.

Certain aspects of the subject matter described in this disclosure can be implemented in a computer-readable medium for wireless communications including instructions that, when executed by a processing system in a UE, cause the processing system to perform operations including: determining carrier groupings for SUL communications supported by the UE, each grouping comprising at least one SUL CC and at least one NSUL CC; and providing signaling indicating a combination of at least one SUL CC and at least two NSUL CC, wherein the signaling also indicates the carrier groupings.

Certain aspects of the subject matter described in this disclosure can be implemented in a computer-readable medium for wireless communications including instructions that, when executed by a processing system in a UE, cause the processing system to perform operations including: determining carrier groupings for SUL communications supported by the UE, each carrier grouping comprising at least one CC carried in an SUL band and at least one CC carried in a NSUL band; and providing signaling indicating the carrier groupings for a combination of at least three CCs jointly carried in at least one SUL band and at least one NSUL band.

Certain aspects of the subject matter described in this disclosure can be implemented in a computer-readable medium for wireless communications including instructions that, when executed by a processing system in a UE, cause the processing system to perform operations including: receiving, from a UE, signaling indicating a combination of at least one SUL CC and at least two NSUL CCs, wherein the signaling also indicates carrier groupings, each grouping comprising at least one SUL CC and at least one NSUL CC; and processing UL transmissions from the UE in accordance with the indicated carrier groupings.

Certain aspects of the subject matter described in this disclosure can be implemented in a computer-readable medium for wireless communications including instructions that, when executed by a processing system in a UE, cause the processing system to perform operations including: receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band; and processing UL transmissions from the UE in accordance with the indicated carrier groupings.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
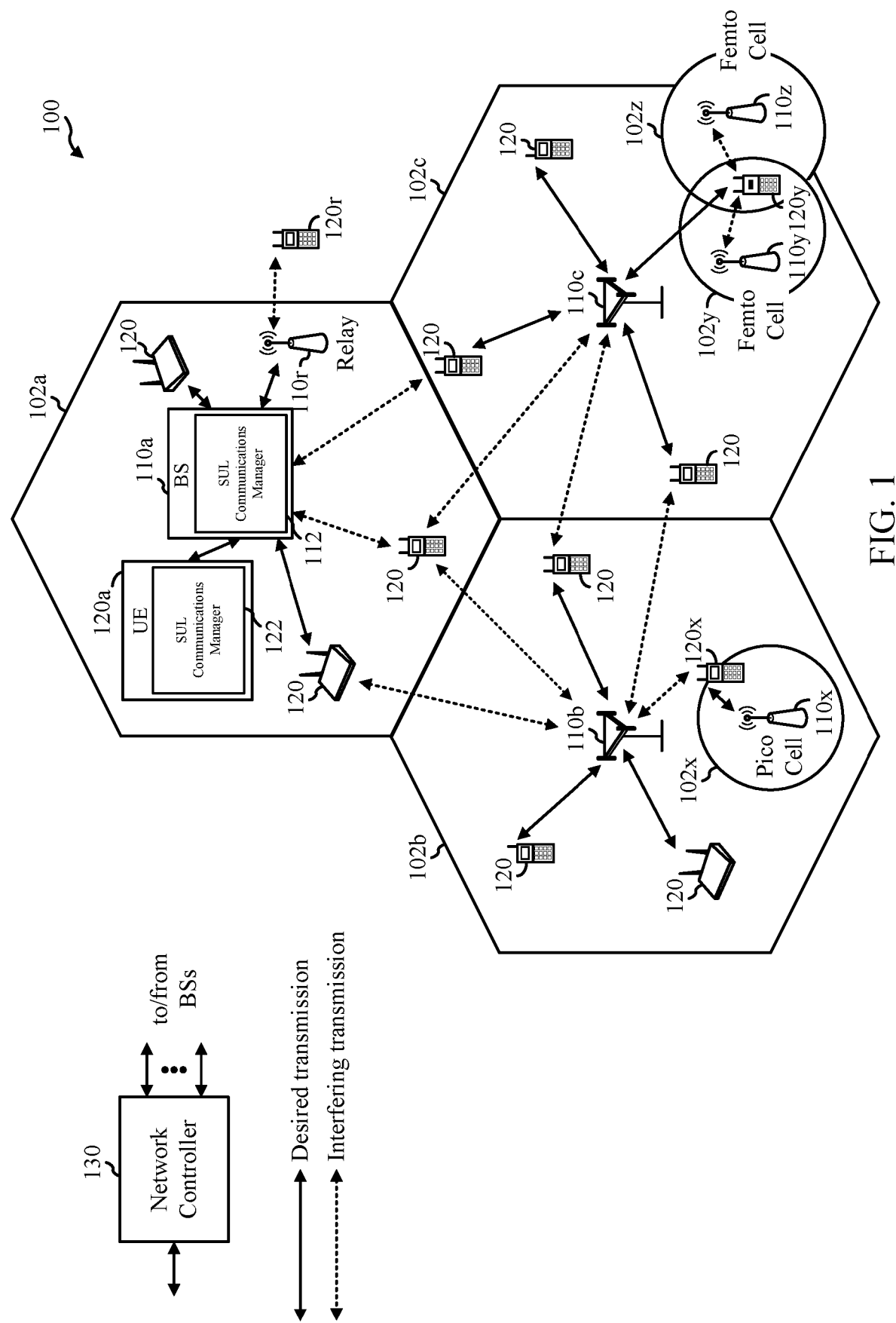
FIG. 1 is a block diagram illustrating an example wireless communication network, in accordance with certain aspects of the present disclosure.

Aspects of the present disclosure provide apparatus, methods, processing systems, and computer-readable mediums for indicating carrier groupings for supplemental uplink (SUL) communications. In current implementations, a serving cell can be configured with two uplink (UL) CCs: one CC carried in a non-supplemental uplink (NSUL) band (also referred to herein as an NSUL carrier or NSUL CC) and one CC carried in an SUL band (also referred to herein as an SUL carrier or SUL CC). However, in cases where more than one NSUL band and/or SUL band, each carrying one CC, is signaled, or in cases where only one NSUL band and only one SUL band, one or both bands carrying more than one CC, is signaled (e.g., such that there exists at least three CCs jointly carried by the bands), a network entity may not be aware of exactly which CCs are to be paired together for SUL communications. Accordingly, the techniques presented herein may incorporate signaling and/or rules in such a way that, from capability signaling provided by a user equipment (UE), potential carrier groupings of NSUL CC(s) and SUL CC(s) in serving cells can be derived. Thus, aspects of the present disclosure provide techniques for improved carrier grouping.

The following description provides examples of indicating carrier pairing for SUL, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (for example, 5G NR) may support various wireless communication services, such as enhanced mobile broadband (eMBB) targeting wide bandwidth (for example, 80 megahertz (MHz) or beyond), millimeter wave (mmWave) targeting high carrier frequency (for example, 25 gigahertz (GHz) or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTIs) to meet respective quality of service (QOS)

requirements. In addition, these services may co-exist in the same time-domain resource (for example, a slot or subframe) or frequency-domain resource (for example, CC).

Example Wireless Communications Network

FIG. 1 illustrates an example wireless communication network 100 in which aspects of the present disclosure may be performed. For example, as shown in FIG. 1, user equipment (UE) 120a may include a supplemental uplink (SUL) communications module 122 that may be configured to perform (or cause UE 120a to perform) operations 800 of FIG. 8. Similarly, base station (BS) 110a may include an SUL communications manager 112 that may be configured to perform (or cause BS 110a to perform) operations 900 of FIG. 9.

As illustrated in FIG. 1, wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, BSs 110a, 110b, and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells. BSs 110 communicate with UEs 120a-y (each also individually referred to herein as UE 120 or collectively as UEs 120) in wireless communication network 100. UEs 120 (for example, 120x, 120y, etc.) may be dispersed throughout wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and send a transmission of the data or other information to a downstream station (for example, a UE 120 or a BS 110), or that relay transmissions between UEs 120, to facilitate communication between devices.

A network controller 130 may couple to a set of BSs 110 and provide coordination and control for these BSs 110. Network controller 130 may communicate with BSs 110 via a backhaul. BSs 110 may also communicate with one another (for example, directly or indirectly) via wireless or wireline backhaul.

Figure 2:
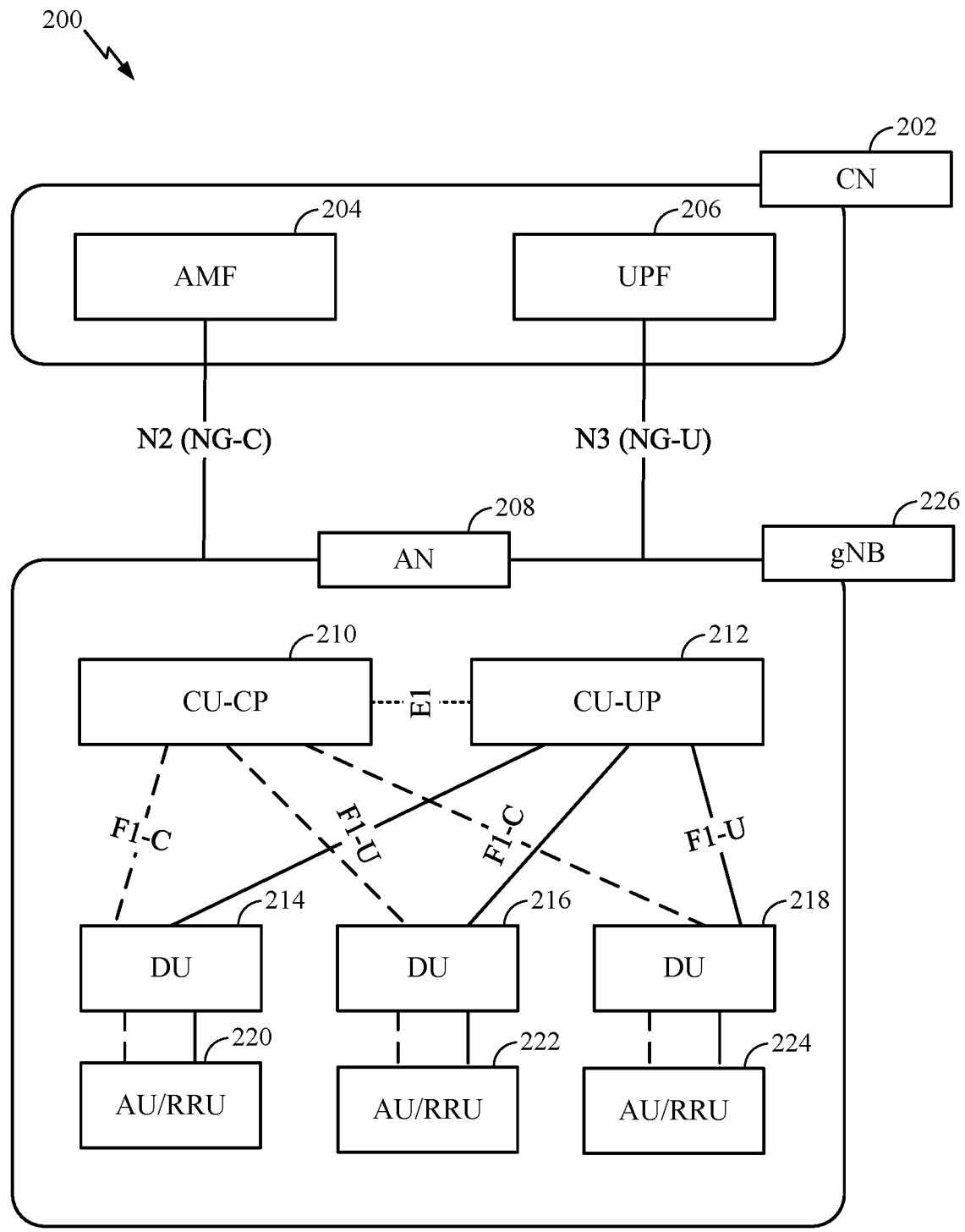
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, distributed RAN 200 includes Core Network (CN) 202 and Access Node 208.

CN 202 may host core network functions. CN 202 may be centrally deployed. CN 202 functionality may be offloaded (e.g., to advanced wireless services (AWS)), in an effort to handle peak capacity. CN 202 may include the Access and Mobility Management Function (AMF) 204 and User Plane Function (UPF) 206. The AMF 204 and UPF 206 may perform one or more of the core network functions.

AN 208 may communicate with CN 202 (e.g., via a backhaul interface). AN 208 may communicate with AMF 204 via an N2 (e.g., NG-C) interface. AN 208 may communicate with UPF 206 via an N3 (e.g., NG-U) interface. AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. CUs and DUs may also be referred to as next generation NodeB (gNB)-CU and gNB-DU, respectively. One or more components of AN 208 may be implemented in a gNB 226. AN 208 may communicate with one or more neighboring gNBs.

CU-CP 210 may be connected to one or more of DUs 214-218. CU-CP 210 and DUs 214-218 may be connected via a F1-C interface. As shown in FIG. 2, CU-CP 210 may be connected to multiple DUs, but the DUs may be connected to only one CU-CP. Although FIG. 2 illustrates only one CU-UP 212, AN 208 may include multiple CU-UPs 212. CU-CP 210 selects the appropriate CU-UP(s) 212 for requested services (e.g., for a UE 120). CU-UP(s) 212 may be connected to CU-CP 210. For example, CU-UP(s) 212 and CU-CP 210 may be connected via an E1 interface. CU-CP(s) 212 may be connected to one or more of DUs 214-218. CU-UP(s) 212 and DUs 214-218 may be connected via an F1-U interface. As shown in FIG. 2, CU-CP 210 may be connected to multiple CU-UPs 212, but the CU-UPs may be connected to only one CU-CP.

A DU, such as DUs 214, 216, and/or 218, may host one or more transmit/receive point(s) (TRP(s)) (which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE 120. Each DU 214-216 may be connected with one of AU/RRUs 220-224.

CU-CP 210 may be connected to multiple DU(s) that are connected to (e.g., under control of) the same CU-UP 212. Connectivity between a CU-UP 212 and a DU may be established by CU-CP 210. For example, the connectivity between the CU-UP 212 and a DU may be established using Bearer Context Management functions. Data forwarding between CU-UP(s) 212 may be via an Xn-U interface.

Distributed RAN 200 may support fronthauling solutions across different deployment types. For example, RAN 200 architecture may be based on transmit network capabilities (e.g., bandwidth, latency, and/or jitter). Distributed RAN 200 may share features and/or components with LTE. For example, AN 208 may support dual connectivity with NR and may share a common fronthaul for LTE and NR. Distributed RAN 200 may enable cooperation between and among DUs 214-218. An inter-DU interface may not be used.

Logical functions may be dynamically distributed in distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in AN 208 and/or UE 120.

Figure 3:
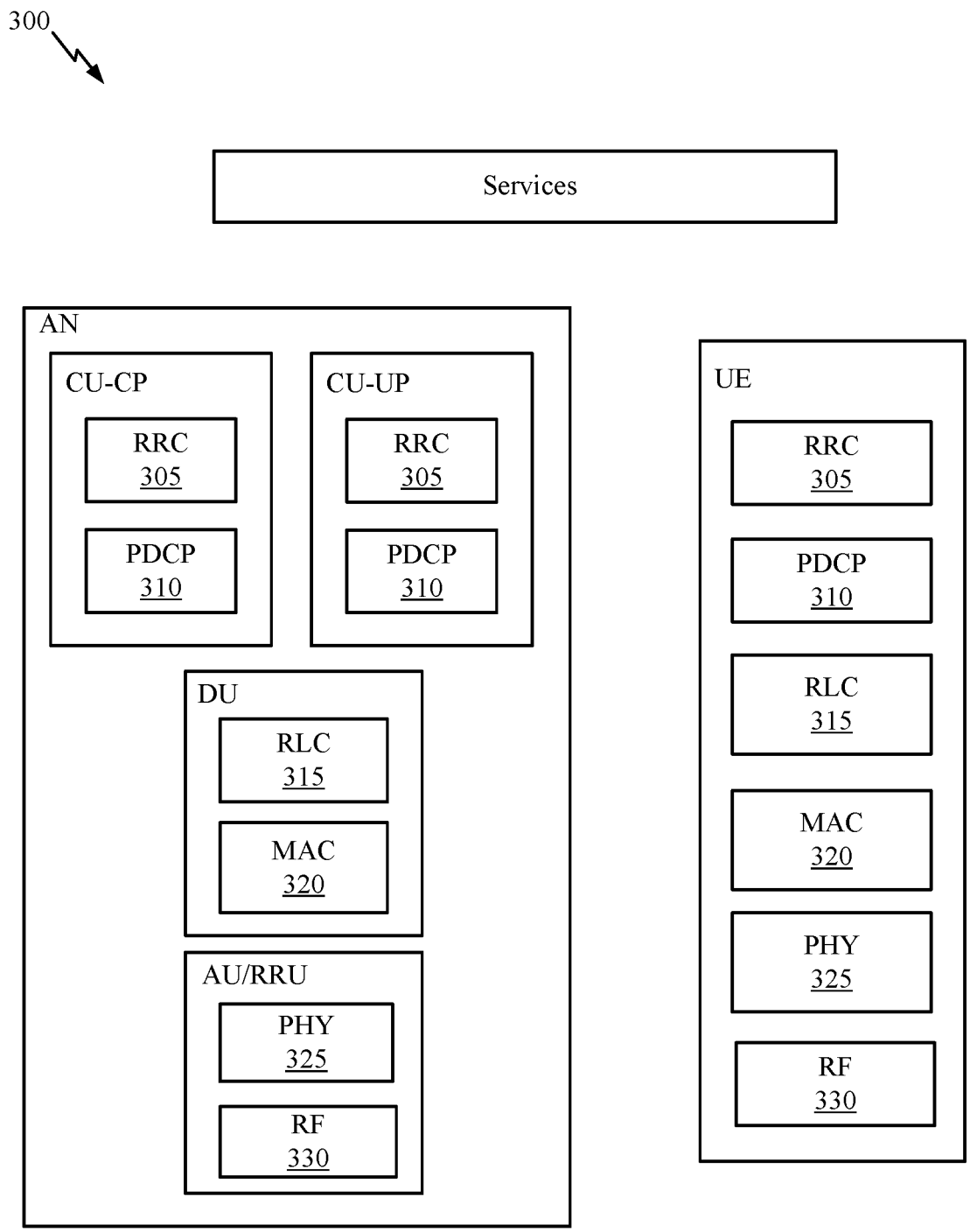
FIG. 3 is a block diagram showing examples for implementing a communications protocol stack in an example RAN architecture, in accordance with certain aspects of the present disclosure.

FIG. 3 is a block diagram showing examples for implementing a communications protocol stack 300 in an example RAN architecture (e.g., such as RAN 200), in accordance with certain aspects of the present disclosure. The illustrated communications protocol stack 300 may be implemented by devices operating in a wireless communication system, such as a 5G NR system (e.g., wireless communication network 100). In various examples, the layers of communications protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or UE 120. As shown in FIG. 3, the system may support various services over one or more protocols. One or more protocol layers of communications protocol stack 300 may be implemented by AN 208 and/or UE 120.

As shown in FIG. 3, communications protocol stack 300 is split in the AN (e.g., AN 208 in FIG. 2). RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement RRC layer 305 and PDCP layer 310. A DU (e.g., DUs 214-218 in FIG. 2) may implement RLC layer 315 and MAC layer 320. The AU/RRU (e.g., AU/RRUs 220-224 in FIG. 2) may implement PHY layer(s) 325 and RF layer(s) 330. PHY layers 325 may include a high PHY layer and a low PHY layer.

The UE (e.g., UE 120 in FIG. 1) may implement the entire protocol stack 300 (e.g., RRC layer 305, PDCP layer 310, RLC layer 315, MAC layer 320, PHY layer(s) 325, and RF layer(s) 330).

Figure 4:
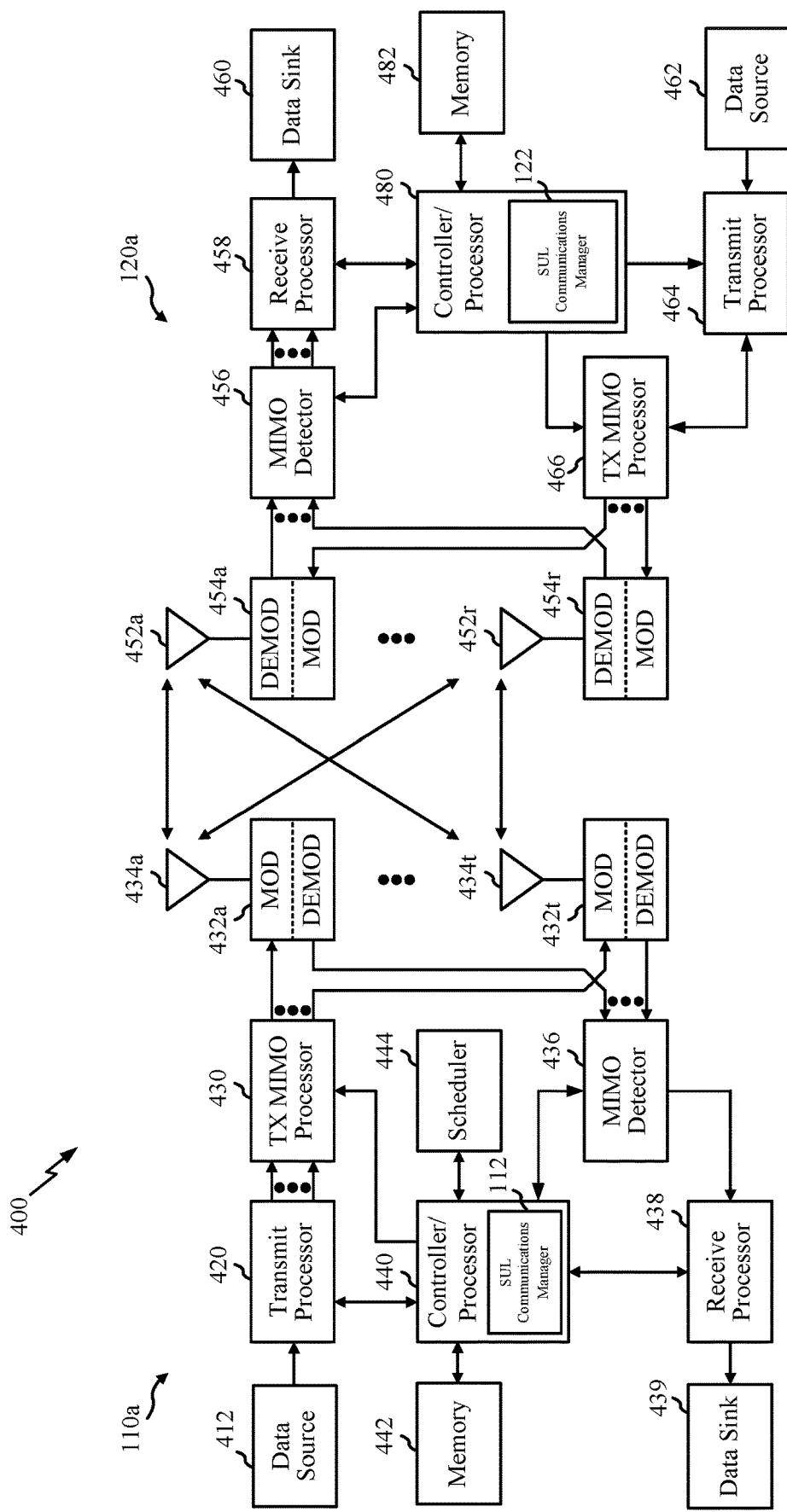
FIG. 4 is a block diagram illustrating an example base station (BS) and an example user equipment (UE), in accordance with certain aspects of the present disclosure.

FIG. 4 is a block diagram illustrating an example BS and an example UE, in accordance with certain aspects of the present disclosure.

At BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. Processor 420 may process (for example, encode and symbol map) the data and control information to obtain data symbols and control symbols, respectively. Transmit processor 420 may also generate reference symbols, such as for the primary synchronization signal (PSS), secondary synchronization signal (SSS), and cell-specific reference signal (CRS). A transmit (TX) multiple-input multiple-output (MIMO) processor 430 may perform spatial processing (for example, precoding) on the data symbols, the control symbols, or the reference symbols, if applicable, and may provide output symbol streams to the modulators (MODs) 432a-432t. Each modulator 432 may process a respective output symbol stream (for example, for orthogonal frequency division multiplexing (OFDM), etc.) to obtain an output sample stream. Each modulator 432 may further process (for example, convert to analog, amplify, filter, and upconvert) the output sample stream to obtain a downlink (DL) signal. DL signals from modulators 432a-432t may be transmitted via the antennas 434a-434t, respectively.

At UE 120, antennas 452a-452r may receive the DL signals from BS 110 and may provide received signals to the demodulators (DEMODs) in transceivers 454a-454r, respectively. Each demodulator may condition (for example, filter, amplify, downconvert, and digitize) a respective received signal to obtain input samples. Each demodulator may further process the input samples (for example, for OFDM, etc.) to obtain received symbols. A MIMO detector 456 may obtain received symbols from all the demodulators in transceivers 454a-454r, perform MIMO detection on the received symbols, if applicable, and provide detected symbols. A receive processor 458 may process (for example, demodulate, deinterleave, and decode) the detected symbols, provide decoded data for UE 120 to a data sink 460, and provide decoded control information to controller/processor 480.

On the uplink (UL), at UE 120, a transmit processor 464 may receive and process data (for example, for the physical uplink shared channel (PUSCH)) from a data source 462 and control information (for example, for the physical uplink control channel (PUCCH) from controller/processor 480. Transmit processor 464 may also generate reference symbols for a reference signal (RS) (for example, for the sounding reference signal (SRS)). The symbols from transmit processor 464 may be precoded by a TX MIMO processor 466, if applicable, further processed by the demodulators in transceivers 454a-454r (for example, for single-carrier frequency division multiplexing (SC-FDM), etc.), and transmitted to BS 110. At BS 110, the UL signals from UE 120 may be received by antennas 434, processed by modulators 432, detected by MIMO detector 436, if applicable, and further processed by a receive processor 438 to obtain decoded data and control information sent by UE 120. Receive processor 438 may provide the decoded data to a data sink 439 and the decoded control information to controller/processor 440.

Memories 442 and 482 may store data and program codes for BS 110 and UE 120, respectively. A scheduler 444 may schedule UEs for data transmission on the DL or UL.

Controller/processor 480, or other processors and modules, at UE 120 may perform or direct the execution of processes for the techniques described herein. As shown in FIG. 4, controller/processor 480 of UE 120 has an SUL communications manager 122 that may be configured to perform operations 800 of FIG. 8, while controller/processor 440 of BS 110 has an SUL communications manager 112 that may be configured to perform operations 900 of FIG. 9, as discussed in further detail below. Although shown at the Controller/Processor, other components of UE 120 or BS 110 may be used to perform the operations described herein.

Figure 5:
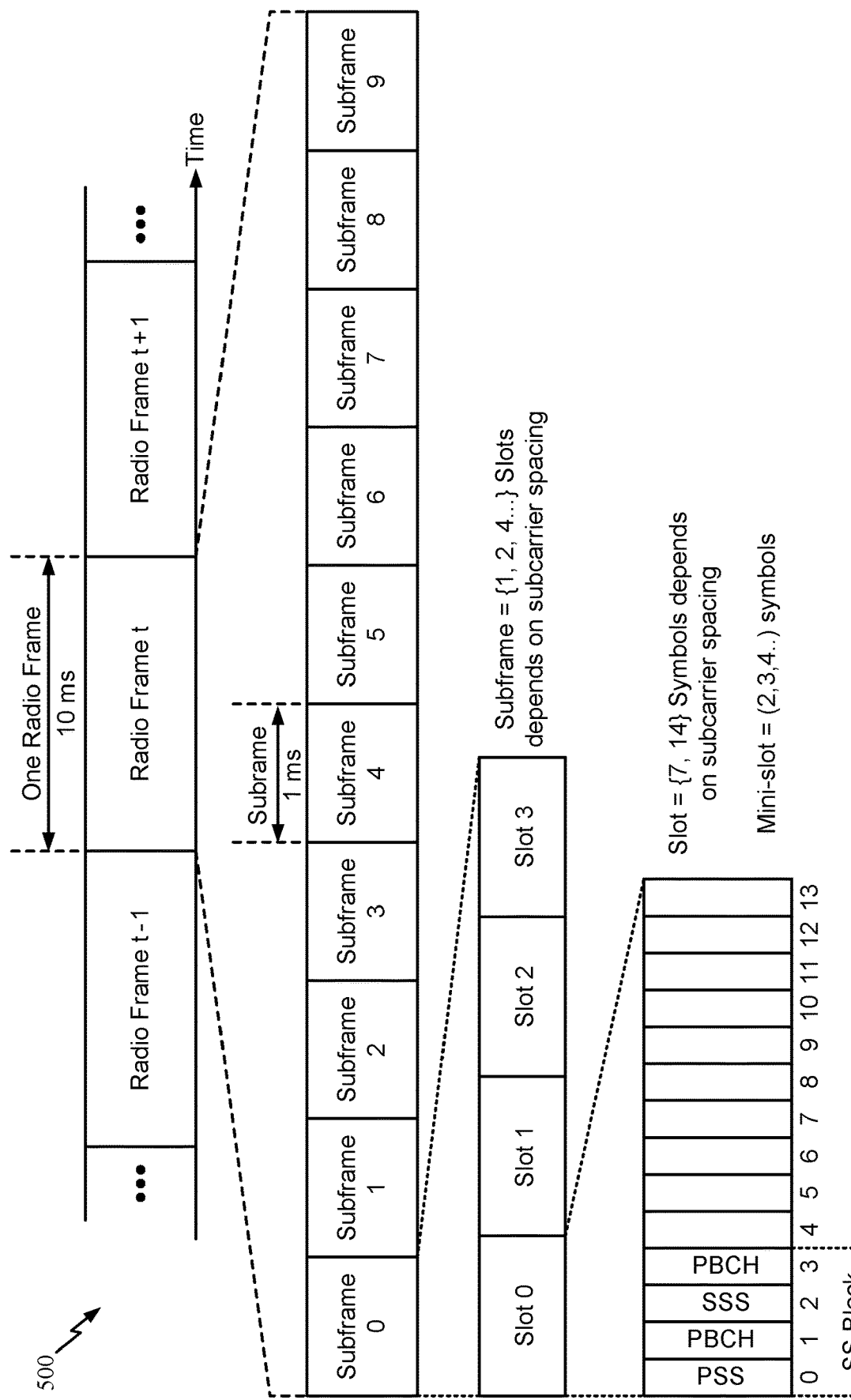
FIG. 5 is an example frame format for certain wireless communications systems (e.g., new radio (NR)), in accordance with certain aspects of the present disclosure.

FIG. 5 is an example frame format 500 for certain wireless communications systems (e.g., NR), in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on the subcarrier spacing (SCS). Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 5. The PSS and SSS may be used by UEs for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into synchronization signal (SS) bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other BS may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Indicating Carrier Groupings for Supplemental Uplink (SUL) Communications Aspects of the present disclosure provide apparatus, methods, processing systems, and computer-readable mediums for indicating carrier groupings for supplemental uplink (SUL) communications. As used herein, carrier grouping(s) may refer to pairings of two or more component carriers (CCs), and more specifically, pairings of at least one CC carried on an SUL band and at least one CC carried on a non-supplemental (NSUL) band. Further, as used herein, the terms carrier(s) and CC(s) may be used interchangeably.

In general, frequency bands may classified into three categories: frequency division duplex (FDD) bands, time division duplex (TDD) bands, and supplemental bands. On the uplink (UL), for example, the FDD and/or TDD bands may be considered NSUL bands, and the supplemental bands may be considered SUL bands. Each band of the different band categories may comprise one or more CCs. Further, it should be appreciated that NSUL bands may also be referred to as NUL bands in the art.

Figure 6:
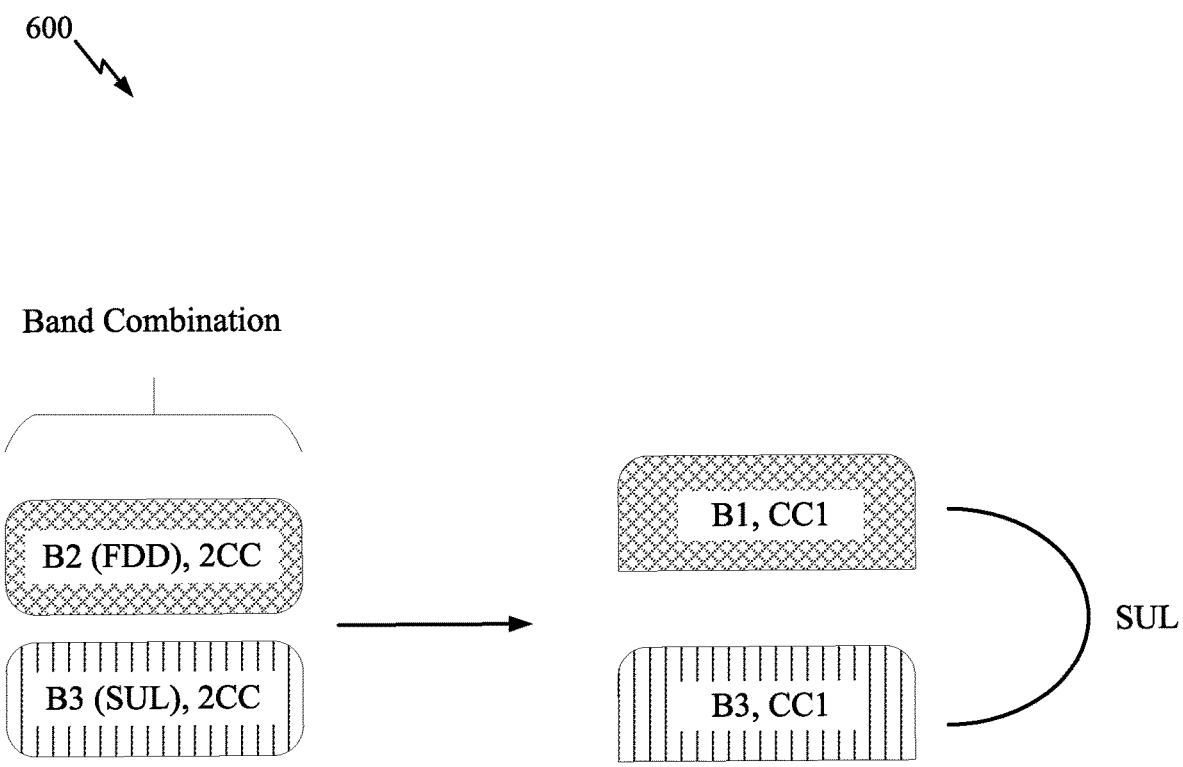
FIG. 6 illustrates an example band combination signaling, in accordance with certain aspects of the present disclosure.

In current implementations, a serving cell can be configured with two UL CCs: one CC carried in an NSUL band (also referred to herein as an NSUL carrier or NSUL CC) and one CC carried in an SUL band (also referred to herein as an SUL carrier or SUL CC). FIG. 6 illustrates an example band combination signaling, in accordance with certain aspects of the present disclosure. As used herein, the terms band combination(s) and combination(s) may be used interchangeably. For example, as shown in FIG. 6, a serving cell is configured with a first CC (e.g., CC1) carried in a first band, B1, e.g., a TDD band or an NSUL band, and a second CC (e.g., CC2) carried in a second band, B2, e.g., an SUL band. SUL capability may be signaled as a band combination of a TDD and/or FDD band (e.g., a CC carried in a TDD band, also referred to as a TDD CC) and an SUL band (e.g., a CC carried in an SUL band, also referred to as an SUL CC). For example, band combination, SUL_n78-n80, may be signaled with two entries: n78 (e.g., TDD band, an NSUL band) and n80 (e.g., SUL band). Further, such supported band combinations may be of two bands, with a single CC in each band. In other words, the signaled band combination may include a first band (e.g., NSUL band) carrying a single CC and a second band (e.g., SUL band) carrying a single CC.

However, current implementations of band combination signaling may be limiting. For example, a UE may signal one or more SUL bands and one or more FDD/TDD bands in a band combination, and where the bands support more than 1 CC, a network entity may not be aware of exactly which CCs are to be paired together for SUL communications given many (e.g., at least, more than one) groupings exists.

Figure 7:
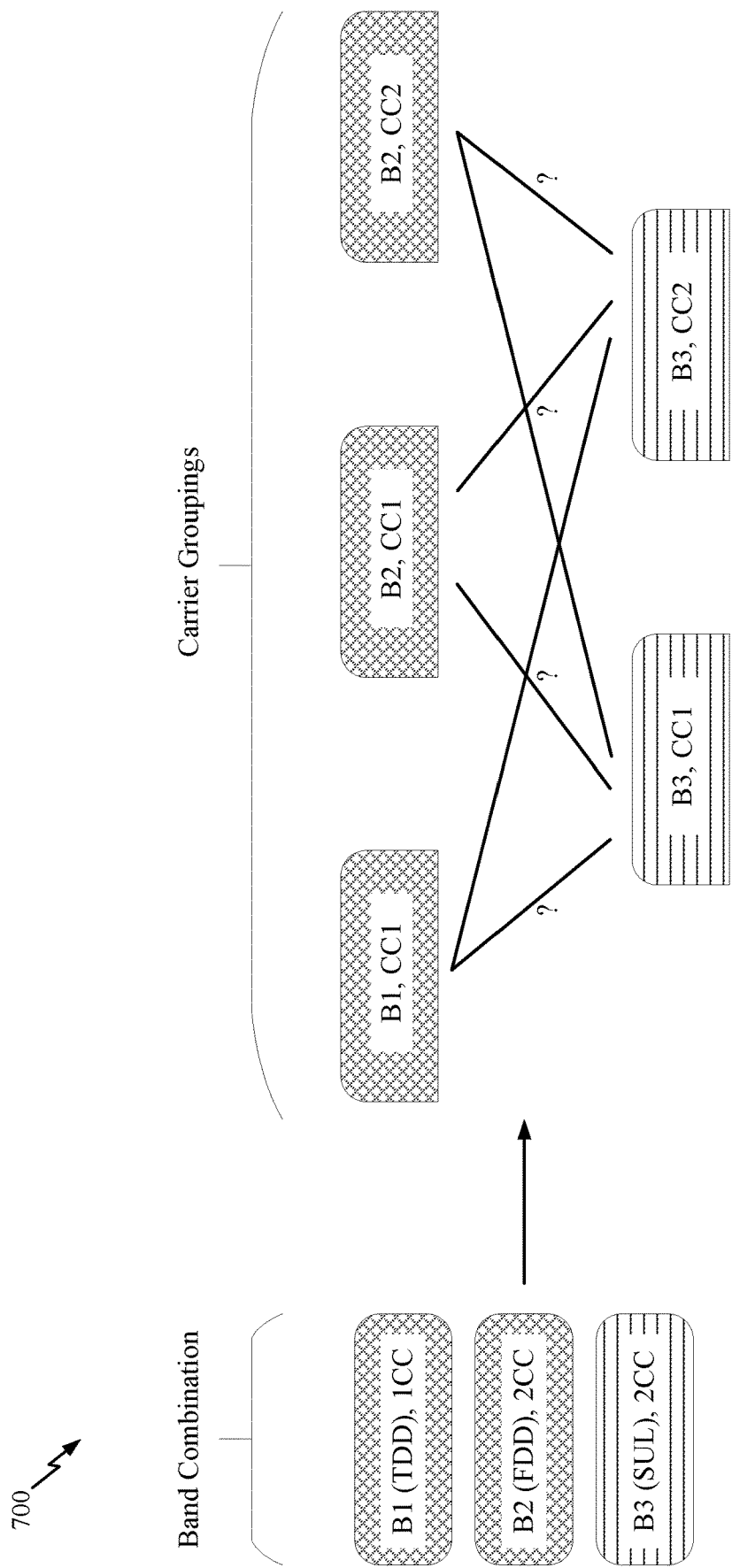
FIG. 7 illustrates an example band combination signaling with two non-supplemental uplink (NSUL) bands and one supplemental uplink (SUL) band, in accordance with certain aspects of the present disclosure.

FIG. 7 illustrates the above-mentioned problem. FIG. 7 illustrates an example band combination signaling 700 with two NSUL bands and one SUL band, in accordance with certain aspects of the present disclosure. As shown in FIG. 7, a UE may signal a band combination including a first band, B1, (e.g., a TDD band or NSUL band) carrying (or supporting) one CC (e.g., CC1), a second band B2, (e.g., an FDD band, or NSUL band) carrying (or supporting) two CCs (e.g., CC1 and CC2), and a third band, B3, (e.g., an SUL band) carrying (or supporting) two CCs. Thus, more than one carrier grouping including one CC carried in an NSUL band and one CC carried in an SUL band given three CCs were signaled. In particular, as shown in FIG. 7, carrier groupings may include (1) B1, CC1 paired with B3, CC1, (2) B2, CC1 paired with B3, CC1, (3) B2, CC2 paired with B3, CC1, (4) B1, CC1 paired with B3, CC2, (5) B2, CC1 paired with B3, CC2, and (6) B2, CC2 paired with B3, CC2. Given six carrier groupings exist, a network entity may not know which CCs may be paired together to form a carrier grouping and which carrier groupings may be used for processing UL transmissions from the UE.

Aspects of the present disclosure, however, provide flexible solutions that may help to support SUL in the context of carrier aggregation (CA). As mentioned previously, with regard to CA, communication links may be through one or more carriers. For example, a UE may use a CA of multiple CCs for communication in one band, or a UE may aggregate multiple CCs across multiple bands for communication.

Accordingly, certain aspects of the present disclosure provide techniques for indicating carrier groupings for SUL communications. The techniques presented herein may incorporate signaling and/or rules in such a way that, from the capability signaling (e.g., bands included in the band combination), the potential pairing of FDD or TDD CC(s) and SUL CC(s) in serving cells can be derived. For example, a UE may indicate to a network entity (e.g., a serving cell) which CCs are paired in a carrier grouping, or could be paired together in a carrier grouping for communication between the UE and the network entity.

Figure 8:
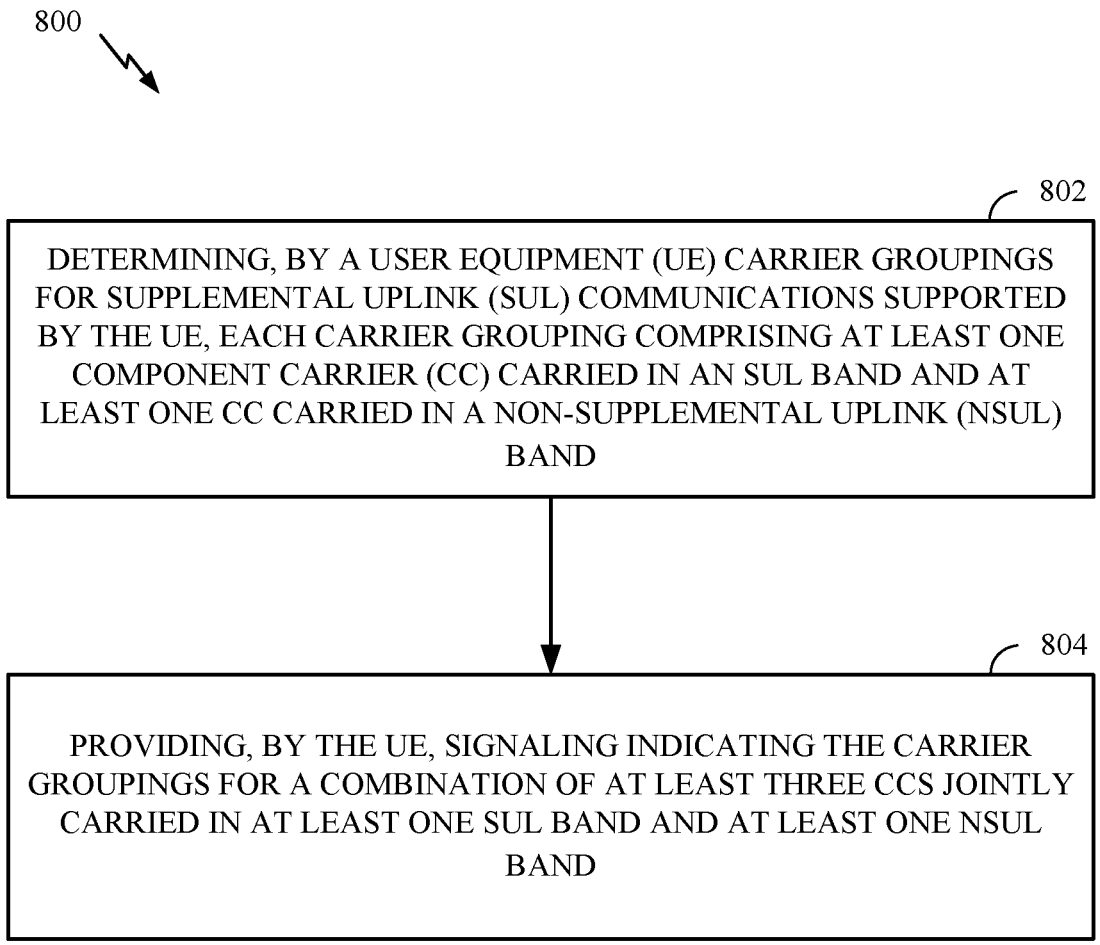
FIG. 8 is a flow diagram illustrating example operations for wireless communications by a UE, in accordance with certain aspects of the present disclosure.

FIG. 8 is a flow diagram illustrating example operations 800 for wireless communications that may be performed by a UE, in accordance with certain aspects of the present disclosure. For example, operations 800 may be performed by UE 120a of FIG. 1 and FIG. 4. Operations 800 may be performed by a UE to indicate CC groupings for SUL communications.

Operations 800 may be implemented as software components that are executed and run on one or more processors (e.g., controller/processor 480 of FIG. 4). Further, the transmission and reception of signals by the UE in operations 800 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

Operations 800 begin, at block 802, by determining carrier groupings for SUL communications supported by the UE, each carrier grouping comprising at least one CC carried in an SUL band and at least one CC carried in an NSUL band.

At block 804, the UE provides signaling (e.g., provided via capability signaling) indicating the carrier groupings for a combination of at least three CCs jointly carried in at least one SUL band and at least one NSUL band. For example, in some cases the combination of the at least three CCs includes at least two CCs carried in at least two NSUL bands where each NSUL band carries one of the two CCs. In other words, the combination may include one CC carried in a first NSUL band, one CC carried in a second NSUL band, and one CC carried in an SUL band. In another example, two CCs (or more) may be carried in a single NSUL band and one or more CCs may be carried in one or more SUL bands. Any combination of three CCs carried in at least one SUL band and at least one NSUL band may be considered. In some aspects, the signaling, at block 804, further indicates the combination of the at least three CCs jointly carried in at least one SUL band and at least one NSUL band.

Figure 9:
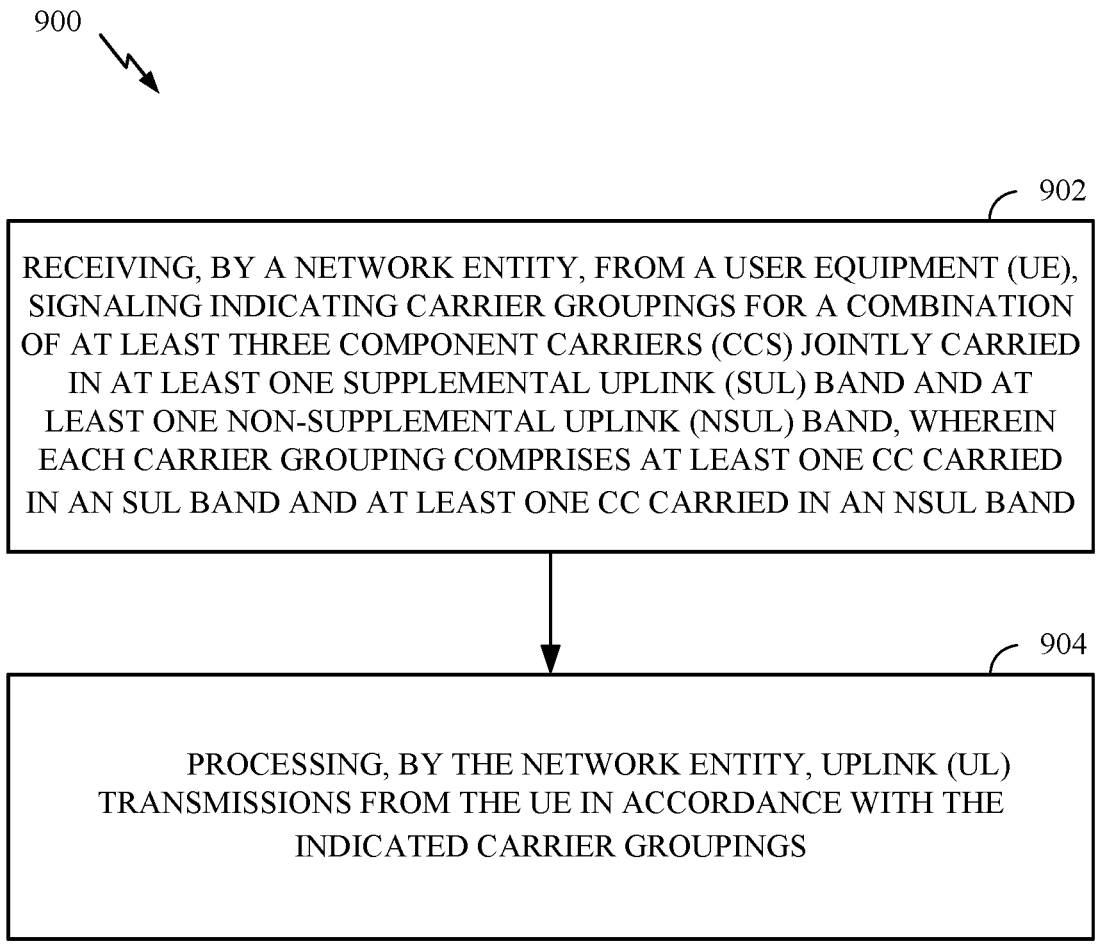
FIG. 9 is a flow diagram illustrating example operations for wireless communications by a network entity, in accordance with certain aspects of the present disclosure.

FIG. 9 is a flow diagram illustrating example operations 900 for wireless communications that may be performed by a network entity, in accordance with certain aspects of the present disclosure. For example, operations 900 may be performed by base station (BS) 110a of FIG. 1 and FIG. 4. Operations 900 may be considered complementary to operations 800 of FIG. 8. In particular, operations 900 may be performed by a network entity to receive an indication of CC groupings for SUL communications from a UE performing operations 800 of FIG. 8.

Operations 900 may be implemented as software components that are executed and run on one or more processors (e.g., controller/processor 440 of FIG. 4). Further, the transmission and reception of signals by the network entity in operations 900 may be enabled, for example, by one or more antennas (e.g., antennas 434 of FIG. 4). In certain aspects, the transmission and/or reception of signals by the network entity may be implemented via a bus interface of one or more processors (e.g., controller/processor 440) obtaining and/or outputting signals.

Operations 900 begin, at block 902, by receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band.

At block 904, the network entity processes uplink (UL) transmissions from the UE in accordance with the indicated carrier groupings.

According to certain aspects, carrier groupings signaled to a serving cell (e.g., network entity), from a UE, may be (1) based on an ordering of bands (or CCs carried in the bands) in the band combination signaled to the serving cell, (2) explicitly signaled for each SUL band in the band combination (or each CC carried in the SUL band(s) of the band combination), (3) predefined, e.g., in 3rd Generation Partnership Project (3GPP) standard specifications, or (4) one or more CCs in one band associated with only one CC in another band, such that there is a multiple to one mapping between CCs in the associated bands.

As mentioned, in certain aspects, serving cell grouping of CCs may be based on an ordering of the bands (or CCs carried in the bands) in the band combination. For example, if the i-th entry (e.g., where i is an integer greater than or equal to one) in the band combination is SUL, the (i−1)-th entry in the band combination is the band the SUL can be paired with. Such carrier grouping may be understood with reference to FIG. 10.

Figure 10:
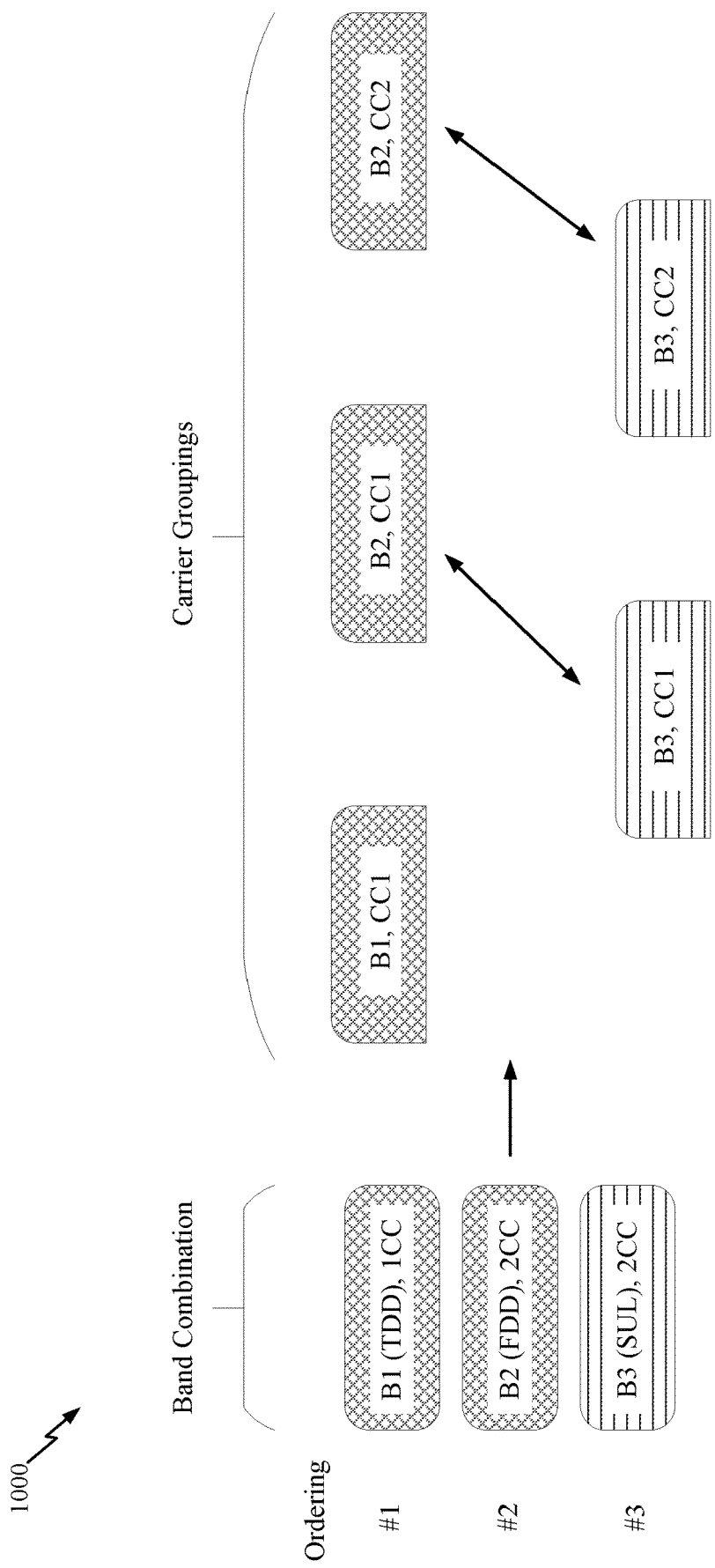
FIG. 10 illustrates an example diagram of carrier grouping based on an ordering of bands in a band combination, in accordance with certain aspects of the present disclosure.

FIG. 10 illustrates an example diagram 1000 of carrier grouping based on an ordering of bands in a band combination, in accordance with certain aspects of the present disclosure. As shown in FIG. 10, a band combination may include B1 (e.g., a TDD band, an NSUL band) carrying CC1, B2 (e.g., an FDD band, an NSUL band) carrying CC1 and CC2 (e.g., two CCs), and B3 (e.g., an SUL band) carrying CC1 and CC (e.g., 2 CCs). The signaling of the band combination may order the bands such that B1 is before B2, and B2 is before B3. Assuming i is equal to three, the third band in the ordered list of bands is an SUL band, and more particularly B3, thus B3 may be paired with the second band in the order list of bands (e.g., (i−1)=(3−1) =2=Band in operation position number 2). As shown in FIG. 10, CCs of B3 are paired with CCs of B2. In the case of multiple CCs per band, as shown in FIG. 10, the number of CCs in each band may be incorporated to determine the carrier pairing. That is, if a given SUL band has X CCs (e.g., where X defines the number of CCs in the band and is an integer greater than or equal to two), the pairing may be with the X CCs in the one or more bands preceding the SUL band in the ordering of the band combination. Accordingly, as shown in the example of FIG. 10, the two CCs of B3 (e.g., the SUL band) may form carrier groupings with the two CCs of B2. In particular, CC1 carried in B3 may be paired with CC1 carried in B2, and CC2 carried in B3 may be paired with CC2 carried in B2.

In certain aspects, the UE may explicitly signal for each SUL band in the band combination (or each CC carried in the SUL band(s) of the band combination) possible groupings with NSUL band(s) in the band combination (or CCs carried in the NSUL band(s) of the band combination). For example, for each SUL band of the band combination, the UE may signal the NSUL band(s) of the band combination for which each SUL band can be paired with (e.g., form a carrier grouping with). Alternatively, for each CC carried by SUL band(s) in the band combination, the UE may signal the CC(s) carried by NSUL band(s) of the band combination for which each CC can be paired with. Such carrier grouping may be understood with reference to FIG. 11.

Figure 11:
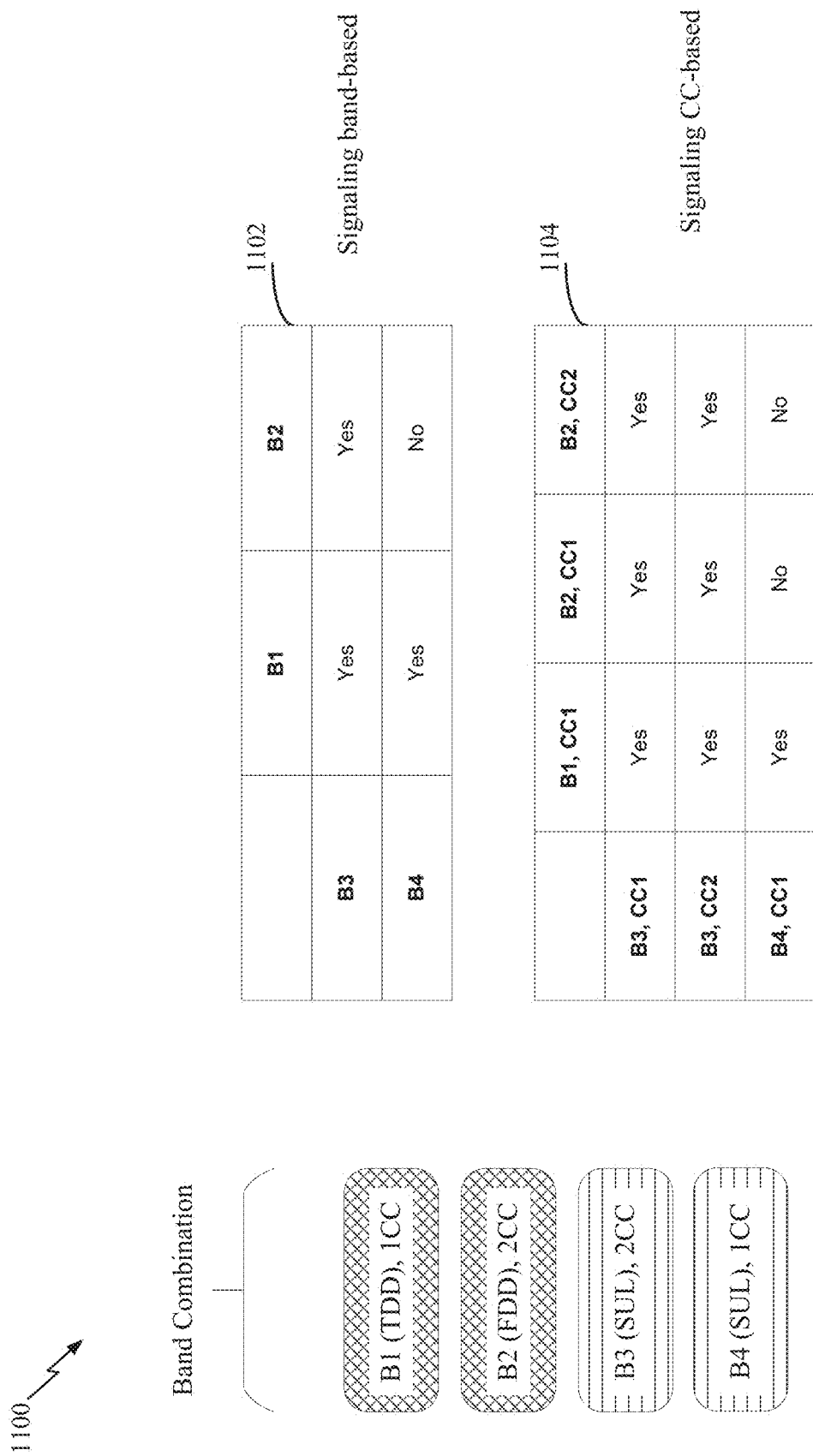
FIG. 11 illustrates an example diagram of explicitly signaled carrier groupings, in accordance with certain aspects of the present disclosure.

FIG. 11 illustrates an example diagram 1100 of explicitly signaled carrier groupings, in accordance with certain aspects of the present disclosure. As shown in FIG. 11, the UE may indicate the pairing on a per-band (e.g., of the band combination) or per-CC (e.g., of the band combination) basis. For example, a band combination may include B1 (e.g., TDD band, NSUL band) carrying CC1, B2 (e.g., FDD band, NSUL band), carrying CC1 and CC2, B3 (e.g., SUL band) carrying CC1 and CC2, and B4 (e.g., SUL band) carrying CC1. Accordingly, the UE may indicate whether B1 and B2 (e.g., NSUL bands) may be grouped with each of B3 and B4 (e.g., SUL bands). As shown in the example table 1102, the UE may indicate that B3 can be paired with B1 and B2, while B4 can only be paired with B1. In the case of per-CC basis indication, the UE may indicate whether CC1 of B1, CC1 of B2, and CC2 of B2 (e.g., NSUL CCs) may be grouped with each of CC1 of B3, CC2 of B3, and CC1 of B4 (e.g., SUL CCs). As shown in the example table 1104, the UE may indicate that CC1 of B3 and CC2 of B3 may each be paired with each CC for each of the NSUL bands, while CC1 of B4 may only be paired with the CC1 in B1.

Figure 12:
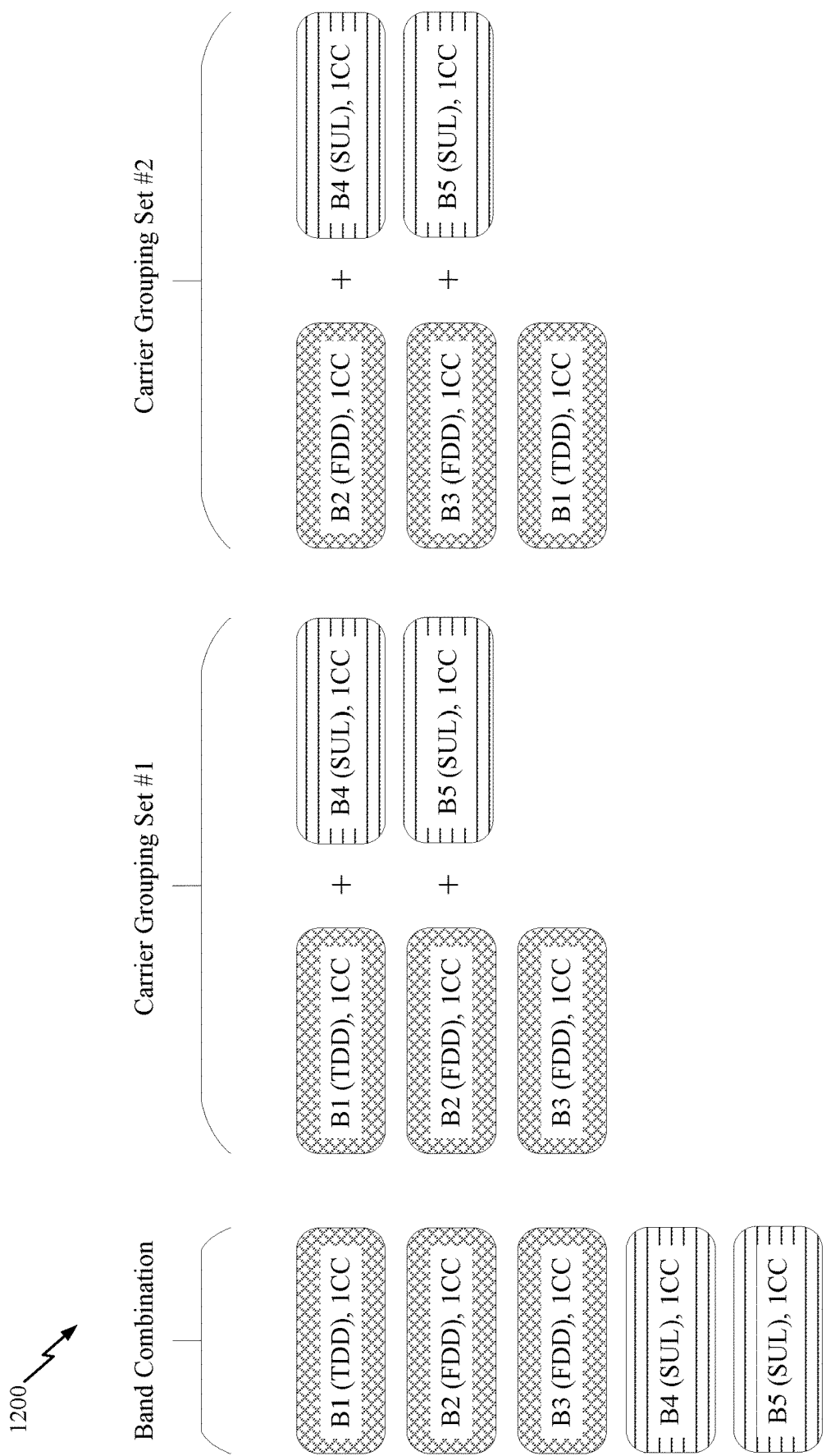
FIG. 12 illustrates an example diagram of explicitly signaled carrier groupings with different carrier grouping sets, in accordance with certain aspects of the present disclosure.

In some cases, the UE may explicitly indicate all possible carrier groupings of bands or CCs within a band combination. FIG. 12 illustrates an example diagram 1200 of explicitly signaled carrier groupings with different carrier grouping sets, in accordance with certain aspects of the present disclosure. As shown in FIG. 12, the UE may indicate one or more carrier grouping sets of potential band grouping or CC groupings. In this case, the UE may also indicate the grouping on a per-band (e.g., of the specific band combination) or per-CC (e.g., of the specific band combination) basis. For example, as shown in FIG. 12, for the band combination involving B1 carrying CC1, B2 carrying CC1 and CC2, B3 carrying CC1 and CC2, and B4 carrying CC1, a first carrier grouping may include grouping B1 with B4 (e.g., when grouping is per-band) and/or grouping CC1 of B1 with CC1 of B4 (e.g., when grouping is per-CC), while a second carrier grouping for the same band combination may include grouping B2 with B4 (e.g., when grouping is per-band) and/or grouping CC1 of B2 with CC1 of B4.

In certain aspects, for one or more band combinations, how bands and/or CCs of each of the one or more band combinations may be grouped in serving cells may be predefined (e.g., in 3GPP standard specifications). For example, carrier grouping set #1 as shown in FIG. 12 may be the only carrier grouping set (or one of a limited number of carrier grouping sets) of band and/or CC pairings permitted within a predefined setting or standard, for the band combination involving B1 carrying CC1, B2 carrying CC1 and CC2, B3 carrying CC1 and CC2, and B4 carrying CC1. Further, where the UE supports a particular band combination, the pairing may be predefined for the UE. For example where the UE supports the band combination shown in FIG. 12, in some cases only carrier grouping set #1 may be defined by the standard, while in some cases only carrier grouping set #2 may be defined by the standard. In another case, both carrier grouping set #1 and carried grouping set #2 of FIG. 12 may be predefined (e.g., in a table in 3GPP Technical Specification (TS) 38.101, similar to a bandwidth combination set (BCS)).

The UE may also indicate (e.g., by a bitmap) which of the carrier grouping sets for the specific band combination are supported. In this implementation, it should be noted that the UE may signal support of a particular carrier grouping set (e.g., carrier grouping set #1), and that carrier grouping set would be predefined in the specification (e.g., for the specific band combination). In some cases, the UE may indicate support for one or more of the predefined carrier grouping sets.

In certain aspects, for intra-band contiguous CA (e.g., where CCs are contiguous and belong to the same operating frequency band), SUL may not be particularly relevant. For the case of UL CA of NSUL, the UE may signal how one band (e.g., a NSUL band with one or more CCs) can be associated with another band (e.g., a SUL with only one CC). In particular, the signaling may indicate one or more carrier groupings of one CC carried in an SUL band and multiple CCs carried in one or more NSUL bands.

Figure 13:
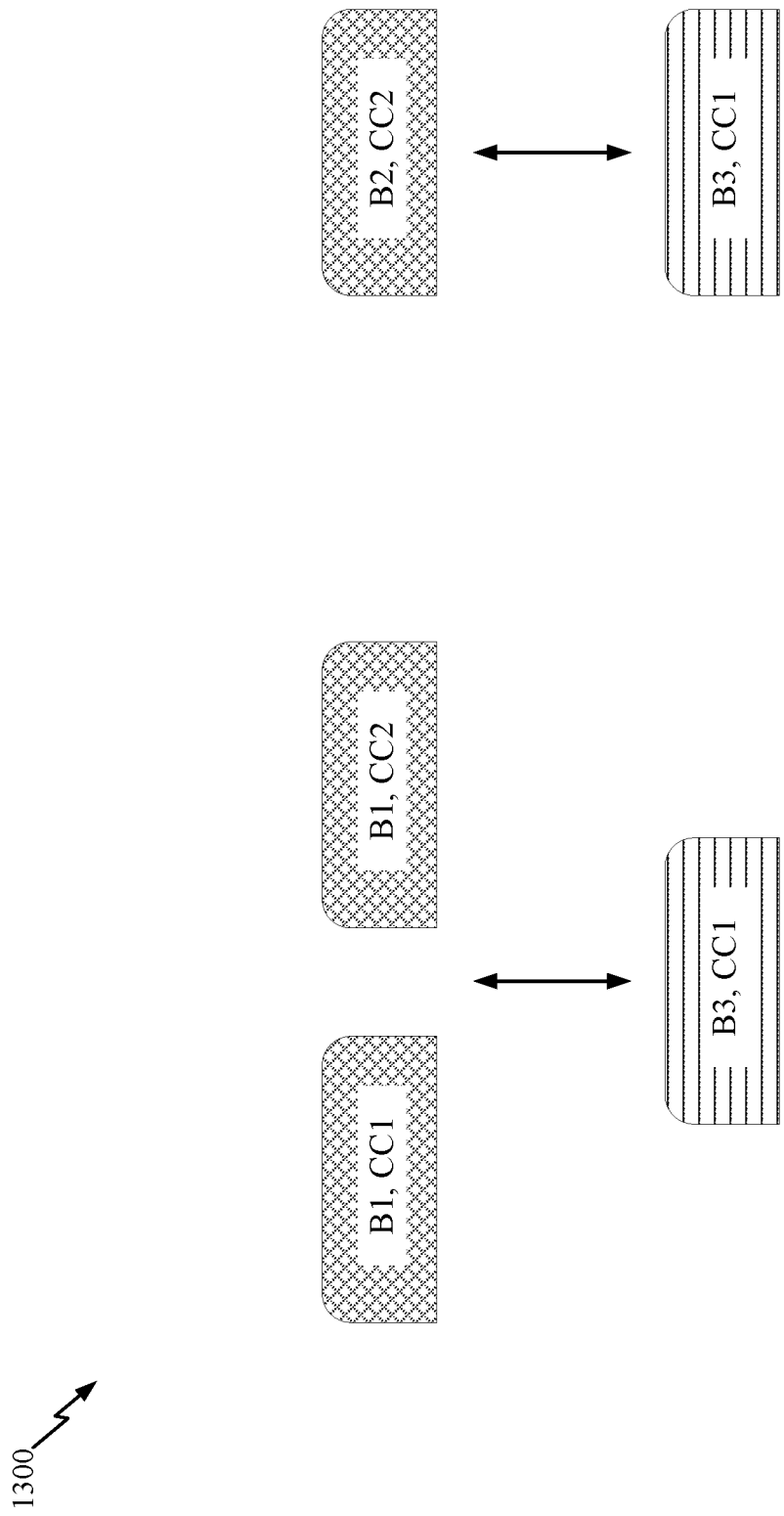
FIG. 13 illustrates an example diagram of multiple carriers grouped with one SUL carrier, in accordance with certain aspects of the present disclosure.

For example, FIG. 13 illustrates an example diagram 1300 of multiple carriers grouped with one SUL carrier, in accordance with certain aspects of the present disclosure. As shown in FIG. 13, each of CC1 and CC2 carried in band 1, B1, (e.g., an NSUL band) may be signaled as potentially being paired with CC1 of band 3, B3, (e.g., an SUL band), as opposed to only CC2 carried in B1 (e.g., an NSUL band) signaled as potentially being paired with CC1 of B3 (e.g., an SUL band). In some cases, rapid switching to SUL may interrupt all CCs in NSUL.

In certain aspects, restrictions may be incorporated in the band/CC grouping indication signaling. For example, if an SUL band has k CCs (e.g., where k defines the number of CCs in the SUL band and is an integer equal to or greater than one), that SUL band may not be allowed to be grouped with an NSUL band with less than k CCs. In other words, the NSUL band may not be grouped with the SUL band unless the NSUL band has a number of CCs that are equal to or greater than the number of CCs carried by the SUL band.

In another case, cross-frequency range (FR) pairing may not be permitted. In other words, a frequency range 1 (FR1) SUL band may not be allowed to be grouped with a frequency range (FR2) NSUL (e.g., TDD or FDD) band. As another example, a CC carried in an SUL band in one FR (e.g., FR1) may not be allowed to be grouped with a CC carried in an NSUL band in another FR (e.g., FR2), according to this restriction.

Furthermore, instead of signaling exactly which bands or CCs may be grouped together, the UE may signal additional or alternative grouping indications. For example, the UE may indicate support of grouping CCs carried in one or more SUL bands to CCs carried in TDD bands only, FDD bands only, or both TDD bands and FDD bands. As another example, the UE may indicate support of grouping CCs carried in one or more SUL bands to CCs carried in an NSUL band in a first frequency range (e.g., FR1 bands only), carried in an NSUL band in a second frequency range (e.g., FR2 bands only), or both. In these cases, the indication from the UE may be made on a specific basis. The indication may be:

(1) Per UE (e.g., all the SUL bands in all band combinations can only be grouped with TDD or FDD);
(2) Per band combination (e.g., all the SUL bands in the corresponding band combination can only be grouped with TDD or FDD bands in the corresponding band combination);
(3) Per band in a band combination (e.g., a given SUL band in the corresponding band combination can only be grouped with TDD or FDD bands in the band combination); and/or
(4) Per band (e.g., a given SUL band can only be grouped with TDD or FDD bands, regardless of the band combination it is in).

Example Wireless Communications Devices

Figure 14:
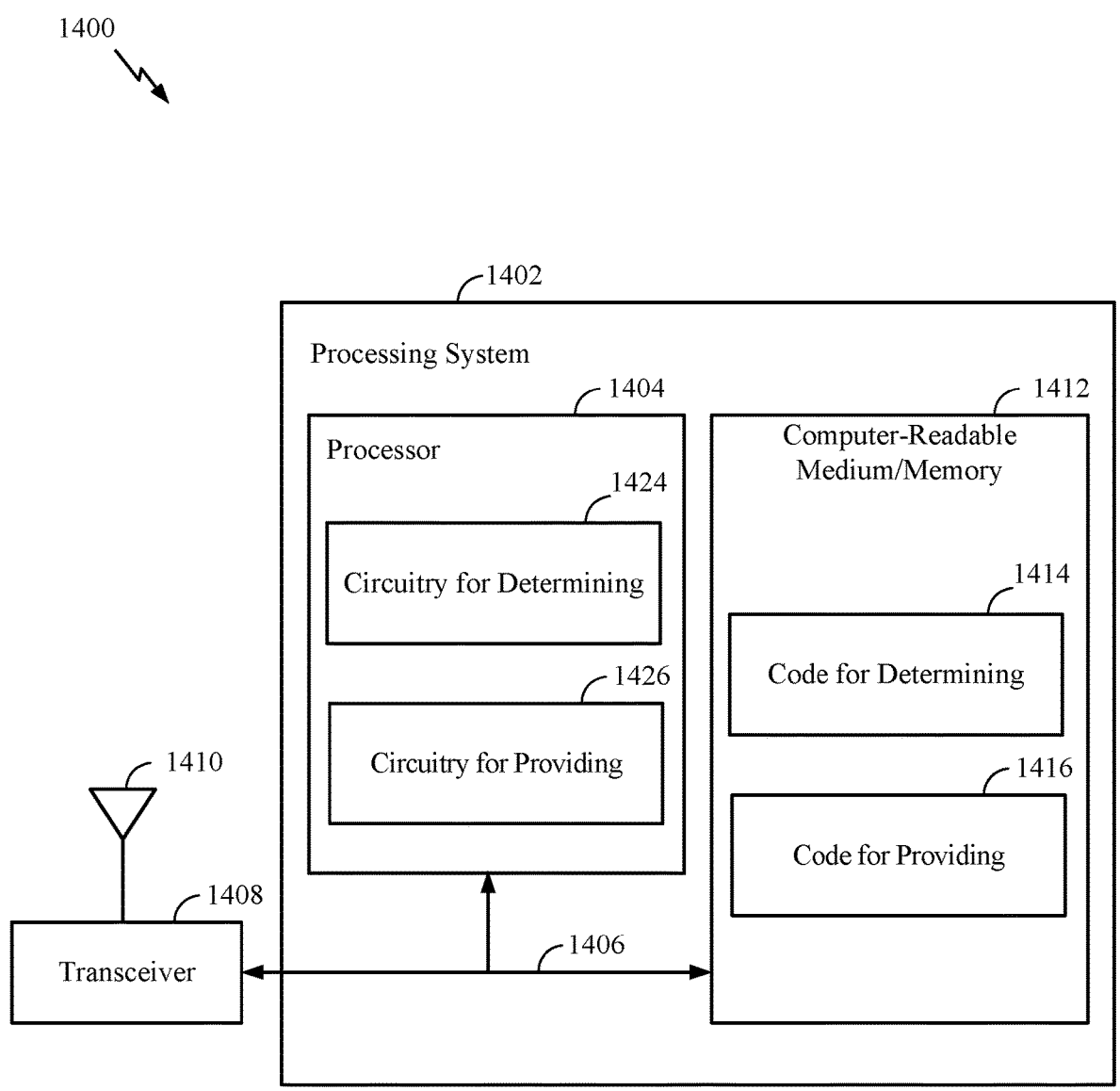
FIG. 14 illustrates a communications device that may include various components configured to perform the operations illustrated in FIG. 8, in accordance with certain aspects of the present disclosure.

FIG. 14 illustrates a communications device 1400 that may include various components (e.g., corresponding to means-plus-function components) operable, configured, or adapted to perform operations for the techniques disclosed herein, such as the operations illustrated in FIG. 8. In some examples, communications device 1400 may be a user equipment (UE), such as UE 120a, as described with respect to FIG. 1 and FIG. 4.

Communications device 1400 includes a processing system 1402 (e.g., corresponding to controller/processor 480) coupled to a transceiver 1408 (e.g., a transmitter and/or a receiver). Transceiver 1408 may correspond to one or more of transmit processor 464, TX MIMO processor 466, modulator/demodulator 454, receive processor 458, and MIMO detector 456 of FIG. 4. Transceiver 1408 is configured to transmit and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by the processor 1404, cause processor 1404 to perform the operations illustrated in FIG. 8, or other operations for performing the various techniques discussed herein. In certain aspects, computer-readable medium/memory 1412 stores code 1414 (an example means for) for determining; and code 1416 (an example means for) for providing.

In certain aspects, code 1414 for determining may include code for determining carrier groupings for supplemental uplink (SUL) communications supported by the UE, each carrier grouping comprising at least one component carrier (CC) carried in an SUL band and at least one CC carried in a non-supplemental uplink (NSUL) band. In certain aspects, code 1416 for providing may include code for providing signaling indicating the carrier groupings for a combination of at least three CCs jointly carried in at least one SUL band and at least one NSUL band.

In certain aspects, processor 1404 has circuitry configured to implement the code stored in computer-readable medium/memory 1412. Processor 1404 includes circuitry 1424 for (an example means for) for determining; and circuitry 1426 (an example means for) for providing.

In certain aspects, circuitry 1424 for determining may include circuitry for determining carrier groupings for SUL communications supported by the UE, each carrier grouping comprising at least one CC carried in an SUL band and at least one CC carried in an NSUL band. In certain aspects, circuitry 1426 for providing may include circuitry for providing signaling indicating the carrier groupings for a combination of at least three CCs jointly carried in at least one SUL band and at least one NSUL band.

Figure 15:
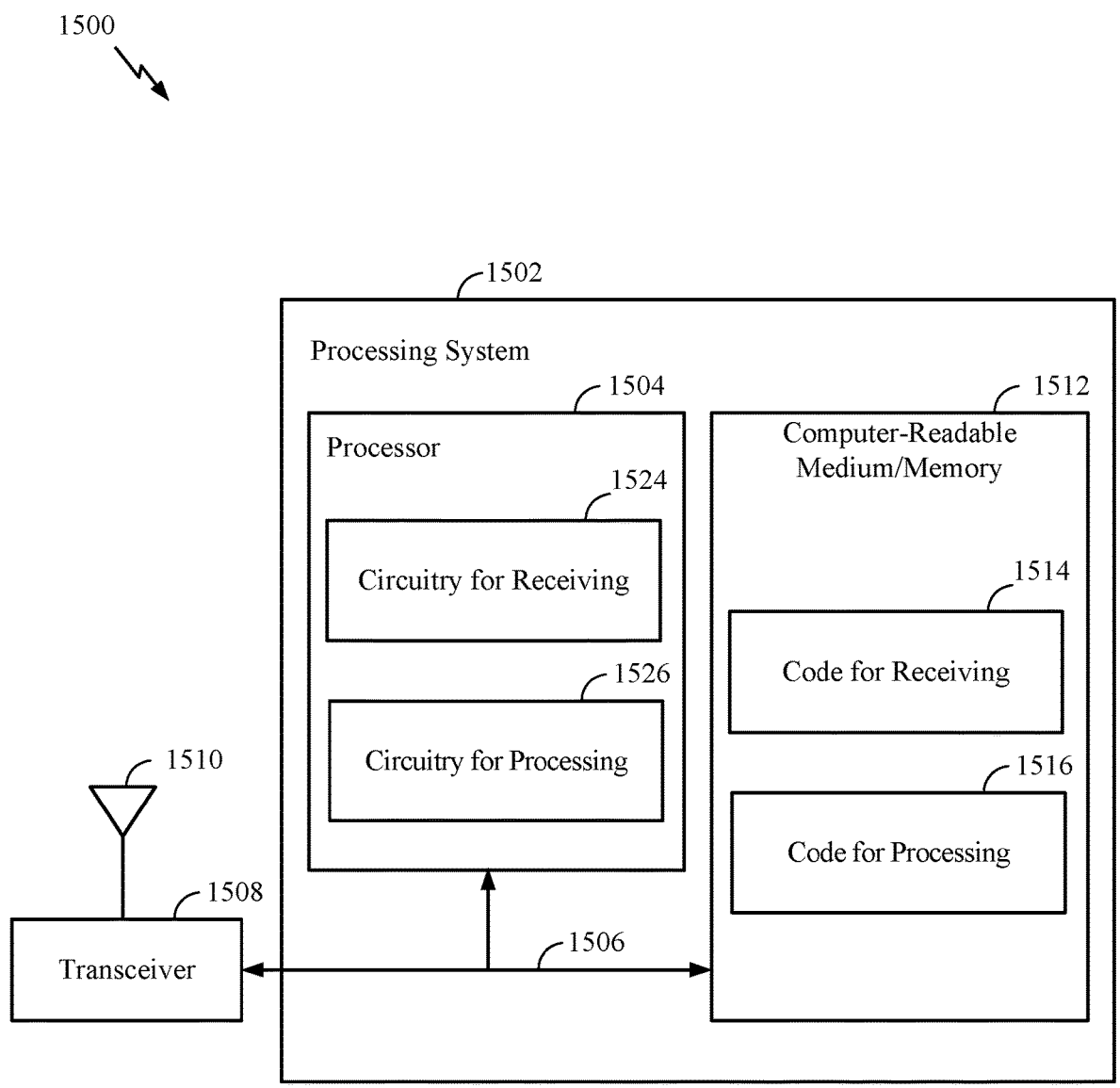
FIG. 15 illustrates a communications device that may include various components configured to perform the operations illustrated in FIG. 9, in accordance with certain aspects of the present disclosure.

FIG. 15 illustrates a communications device 1500 that may include various components (e.g., corresponding to means-plus-function components) operable, configured, or adapted to perform operations for the techniques disclosed herein, such as the operations illustrated in FIG. 9. In some examples, communications device 1500 may be a network entity or base station (BS), such as BS 110a, as described with respect to FIG. 1 and FIG. 4.

Communications device 1500 includes a processing system 1502 (e.g., corresponding to controller/processor 280) coupled to a transceiver 1508 (e.g., a transmitter and/or a receiver). Transceiver 1508 may correspond to one or more of transmit processor 464, TX MIMO processor 466, modulator/demodulator 454, receive processor 458, and MIMO detector 456 of FIG. 4. Transceiver 1508 is configured to transmit and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform the operations illustrated in FIG. 9, or other operations for performing the various techniques discussed herein. In certain aspects, computer-readable medium/memory 1512 stores code 1514 (an example means for) for receiving; and code 1516 (an example means for) for processing.

In certain aspects, code 1514 for receiving may include code for receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band. In certain aspects, code 1516 for processing may include code for processing uplink (UL) transmissions from the UE in accordance with the indicated carrier groupings.

In certain aspects, processor 1504 has circuitry configured to implement the code stored in computer-readable medium/memory 1512. Processor 1504 includes circuitry 1524 (an example means for) for receiving; and circuitry 1526 (an example means for) for processing.

In certain aspects, circuitry 1524 for receiving may include circuitry for receiving, from a UE, signaling indicating carrier groupings for a combination of at least three CCs jointly carried in at least one SUL band and at least one NSUL band, wherein each carrier grouping comprises at least one CC carried in an SUL band and at least one CC carried in an NSUL band. In certain aspects, circuitry 1526 for processing may include circuitry for processing UL transmissions from the UE in accordance with the indicated carrier groupings.

SUL communications manager 112 and 122 may support wireless communication in accordance with examples as disclosed herein.

SUL communications manager 112 and 122 may be an example of means for performing various aspects described herein. SUL communications manager 112 and 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, SUL communications manager 112 and 122, or its sub-components, may be implemented in code (e.g., as configuration management software or firmware) executed by a processor, or any combination thereof. If implemented in code executed by a processor, the functions of SUL communications manager 112 and 122, or its sub-components may be executed by a general-purpose processor, a DSP, an ASIC, a FPGA or other programmable logic device.

In some examples, SUL communications manager 112 and 122 may be configured to perform various operations (e.g., receiving, determining, transmitting) using or otherwise in cooperation with transceiver 1408 or 1508.

SUL communications manager 112 and 122, or its sub-components, may be physically located at various positions, including being distributed such that portions of functions are implemented at different physical locations by one or more physical components. In some examples, SUL communications manager 112 and 122, or its sub-components, may be a separate and distinct component in accordance with various aspects of the present disclosure. In some examples, SUL communications manager 112 and 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communications by a user equipment (UE), comprising: determining carrier groupings for supplemental uplink (SUL) communications supported by the UE, each carrier grouping comprising at least one component carrier (CC) carried in an SUL band and at least one CC carried in a non-supplemental uplink (NSUL) band; and providing signaling indicating the carrier groupings for a combination of at least three CCs jointly carried in at least one SUL band and at least one NSUL band.

Clause 2: The method of Clause 1, wherein the signaling further indicates the combination of the at least three CCs jointly carried in at least one SUL band and at least one NSUL band.

Clause 3: The method of Clause 1 or 2, wherein: the combination of the at least three CCs includes at least two CCs, carried in at least two NSUL bands each having at least one CC of the at least two CCs.

Clause 4: The method of any of Clauses 1-3, wherein the signaling is provided via capability signaling.

Clause 5: The method of any of Clauses 1-4, wherein the signaling indicates the carrier groupings by explicitly signaling, for each of the at least one SUL band of the combination, an indication of at least one NSUL band that forms carrier groupings with the at least one SUL band.

Clause 6: The method of any of Clauses 1-5, wherein the signaling indicates the carrier groupings by explicitly signaling, for each CC carried in each of the at least one SUL band of the combination, an indication of at least one CC in an NSUL band that forms a carrier grouping with each CC carried in the at least one SUL band.

Clause 7: The method of any of Clauses 1-6, wherein the signaling indicates multiple sets of carrier groupings for the combination.

Clause 8: The method of any of Clauses 1-7, wherein: the UE determines the carrier groupings based, at least in part, on one or more defined carrier groupings; and the signaling indicates the carrier groupings for the one or more of the defined carrier groupings supported by the UE.

Clause 9: The method of Clause 8, wherein the signaling further comprises a bitmap indicating the one or more defined carrier groupings supported by the UE.

Clause 10: The method of any of Clauses 2-9, wherein: the signaling indicates the at least one SUL band and the at least one NSUL band of the combination in an order; and the signaling indicates the carrier groupings based, at least in part, on the order.

Clause 11: The method of Clause 10, wherein the order comprises the at least one NSUL band before the at least one SUL band.

Clause 12: The method of Clause 11, wherein: multiple CCs of the at least three CCs comprise CCs carried in an SUL band of the at least one SUL band; and each of the multiple CCs in the SUL band forms a carrier grouping with at least one CC of multiple CCs carried in the at least one NSUL band.

Clause 13: The method of any of Clauses 1-12, wherein the signaling indicating the carrier groupings comprises signaling indicating one or more carrier groupings of one CC carried in an SUL band and multiple CCs carried in one or more NSUL bands.

Clause 14: The method of Clause 13, wherein the signaling further indicates that a transmission in the one CC carried in the SUL band is not concurrent without a transmission in any of the multiple CCs of the one or more NSUL bands.

Clause 15: The method of any of Clauses 1-14, wherein the UE determines the carrier groupings subject to one or more restrictions.

Clause 16: The method of Clause 15, wherein the one or more restrictions comprise at least one of: when an SUL band has k CCs, the SUL band is not allowed to be grouped with an NSUL band having fewer than k CCs; or when a CC carried in an SUL band is in one frequency range (FR), the CC carried in the SUL band is not allowed to be grouped with a CC carried in an NSUL band in another FR.

Clause 17: The method of any of Clauses 1-16, wherein the signaling indicates at least one of: support of grouping CCs carried in one or more SUL bands with CCs carried in time division duplexed (TDD) bands only, frequency division duplexed (FDD) bands only, or both TDD bands and FDD bands; or support of grouping CCs carried in one or more SUL bands with CCs carried in a first frequency range (FR), a second FR, or both the first FR and the second FR.

Clause 18: A method for wireless communications by a network entity, comprising: receiving, from a user equipment (UE), signaling indicating carrier groupings for a combination of at least three component carriers (CCs) jointly carried in at least one supplemental uplink (SUL) band and at least one non-supplemental uplink (NSUL) band, wherein each carrier grouping comprises at least one CC carried in an SUL band and at least one CC carried in an NSUL band; and processing uplink (UL) transmissions from the UE in accordance with the indicated carrier groupings.

Clause 19: The method of Clause 18, wherein the signaling further indicates the combination of the at least three CCs jointly carried in at least one SUL band and at least one NSUL band.

Clause 20: The method of Clause 18 or 19, wherein the combination of the at least three CCs includes at least two CCs carried in at least two NSUL bands each having at least one CC of the at least two CCs.

Clause 21: The method of any of Clauses 18-20, wherein the signaling is provided via capability signaling.

Clause 22: The method of any of Clauses 18-21, wherein the UE provides explicit signaling indicating, for each of the at least one SUL band of the combination, at least one NSUL band that forms carrier groupings with the at least one SUL band.

Clause 23: The method of any of Clauses 18-22, wherein the UE provides explicit signaling, for each CC carried in each of the at least one SUL band of the combination, an indication of at least one CC in an NSUL band that forms a carrier grouping with each CC carried in the at least one SUL band.

Clause 24: The method of any of Clauses 18-23, wherein the UE provides explicit signaling for multiple sets of carrier groupings for the combination.

Clause 25: The method of any of Clauses 18-24, wherein the signaling indicates the carrier groupings for one or more defined carrier groupings supported by the UE.

Clause 26: The method of Clause 25, wherein the signaling further comprises a bitmap indicating the one or more defined carrier groupings supported by the UE.

Clause 27: The method of any of Clauses 19-26, wherein: the signaling indicates the at least one SUL band and the at least one NSUL band of the combination in an order; and the signaling indicates the carrier groupings are indicated based on the order.

Clause 28: The method of Clause 27, wherein the order comprises the at least one NSUL band before the at least one SUL band.

Clause 29: An apparatus comprising memory, a transceiver, and at least one processor communicatively coupled to the memory and the transceiver, the at least one processor configured to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   determining carrier groupings for supplemental uplink (SUL) communications supported by the UE, each carrier grouping comprising at least one component carrier (CC) carried in an SUL band and at least one CC carried in a non-supplemental uplink (NSUL) band; and providing signaling indicating the carrier groupings for a combination of at least three CCs jointly carried in at least one SUL band and at least one NSUL band.

2. The method of claim 1, wherein the signaling further indicates the combination of the at least three CCs jointly carried in at least one SUL band and at least one NSUL band.

3. The method of claim 1, wherein:
the combination of the at least three CCs includes at least two CCs, carried in at least two NSUL bands each having at least one CC of the at least two CCs.

4. The method of claim 1, wherein the signaling is provided via capability signaling.

5. The method of claim 1, wherein the signaling indicates the carrier groupings by explicitly signaling, for each of the at least one SUL band of the combination, an indication of at least one NSUL band that forms carrier groupings with the at least one SUL band.

6. The method of claim 1, wherein the signaling indicates the carrier groupings by explicitly signaling, for each CC carried in each of the at least one SUL band of the combination, an indication of at least one CC in an NSUL band that forms a carrier grouping with each CC carried in the at least one SUL band.

7. The method of claim 1, wherein the signaling indicates multiple sets of carrier groupings for the combination.

8. The method of claim 1, wherein:
the UE determines the carrier groupings based, at least in part, on one or more defined carrier groupings; and
the signaling indicates the carrier groupings for the one or more of the defined carrier groupings supported by the UE.

9. The method of claim 8, wherein the signaling further comprises a bitmap indicating the one or more defined carrier groupings supported by the UE.

10. The method of claim 2, wherein:
the signaling indicates the at least one SUL band and the at least one NSUL band of the combination in an order; and
the signaling indicates the carrier groupings based, at least in part, on the order.

11. The method of claim 10, wherein the order comprises the at least one NSUL band before the at least one SUL band.

12. The method of claim 11, wherein:
multiple CCs of the at least three CCs comprise CCs carried in an SUL band of the at least one SUL band; and
each of the multiple CCs in the SUL band forms a carrier grouping with at least one CC of multiple CCs carried in the at least one NSUL band.

13. The method of claim 1, wherein the signaling indicating the carrier groupings comprises signaling indicating one or more carrier groupings of one CC carried in an SUL band and multiple CCs carried in one or more NSUL bands.

14. The method of claim 13, wherein the signaling further indicates that a transmission in the one CC carried in the SUL band is not concurrent without a transmission in any of the multiple CCs of the one or more NSUL bands.

15. The method of claim 1, wherein the UE determines the carrier groupings subject to one or more restrictions.

16. The method of claim 15, wherein the one or more restrictions comprise at least one of:
when an SUL band has k CCs, the SUL band is not allowed to be grouped with an NSUL band having fewer than k CCs; or when a CC carried in an SUL band is in one frequency range (FR), the CC carried in the SUL band is not allowed to be grouped with a CC carried in an NSUL band in another FR.

17. The method of claim 1, wherein the signaling indicates at least one of:
support of grouping CCs carried in one or more SUL bands with CCs carried in time division duplexed (TDD) bands only, frequency division duplexed (FDD) bands only, or both TDD bands and FDD bands; or
support of grouping CCs carried in one or more SUL bands with CCs carried in a first frequency range (FR), a second FR, or both the first FR and the second FR.

18. A method for wireless communications by a network entity, comprising:
receiving, from a user equipment (UE), signaling indicating carrier groupings for a combination of at least three component carriers (CCs) jointly carried in at least one supplemental uplink (SUL) band and at least one non-supplemental uplink (NSUL) band, wherein each carrier grouping comprises at least one CC carried in an SUL band and at least one CC carried in an NSUL band; and
processing uplink (UL) transmissions from the UE in accordance with the indicated carrier groupings.

19. The method of claim 18, wherein the signaling further indicates the combination of the at least three CCs jointly carried in at least one SUL band and at least one NSUL band.

20. The method of claim 18, wherein the combination of the at least three CCs includes at least two CCs carried in at least two NSUL bands each having at least one CC of the at least two CCs.

21. The method of claim 18, wherein the signaling is provided via capability signaling.

22. The method of claim 18, wherein the UE provides explicit signaling indicating, for each of the at least one SUL band of the combination, at least one NSUL band that forms carrier groupings with the at least one SUL band.

23. The method of claim 18, wherein the UE provides explicit signaling, for each CC carried in each of the at least one SUL band of the combination, an indication of at least one CC in an NSUL band that forms a carrier grouping with each CC carried in the at least one SUL band.

24. The method of claim 18, wherein the UE provides explicit signaling for multiple sets of carrier groupings for the combination.

25. The method of claim 18, wherein the signaling indicates the carrier groupings for one or more defined carrier groupings supported by the UE.

26. The method of claim 25, wherein the signaling further comprises a bitmap indicating the one or more defined carrier groupings supported by the UE.

27. The method of claim 19, wherein:
the signaling indicates the at least one SUL band and the at least one NSUL band of the combination in an order; and
the signaling indicates the carrier groupings are indicated based on the order.

28. The method of claim 27, wherein the order comprises the at least one NSUL band before the at least one SUL band.

29. An apparatus for wireless communications by a user equipment (UE), comprising:
at least one processor; and
a memory coupled to the at least one processor to cause the apparatus to:
determine carrier groupings for supplemental uplink (SUL) communications supported by the UE, each carrier grouping comprising at least one component carrier (CC) carried in an SUL band and at least one CC carried in a non-supplemental uplink (NSUL) band; and provide signaling indicating the carrier groupings for a combination of at least three CCs jointly carried in at least one SUL band and at least one NSUL band.

30. An apparatus for wireless communications by a network entity, comprising:

at least one processor; and a memory coupled to the at least one processor to cause the apparatus to:

receive, from a user equipment (UE), signaling indicating carrier groupings for a combination of at least three component carriers (CCs) jointly carried in at least one supplemental uplink (SUL) band and at least one non-supplemental uplink (NSUL) band, wherein each carrier grouping comprises at least one CC carried in an SUL band and at least one CC carried in an NSUL band; and process uplink (UL) transmissions from the UE in accordance with the indicated carrier groupings.

* * * * *